(12) United States Patent
Wang

(10) Patent No.: US 9,696,527 B2
(45) Date of Patent: Jul. 4, 2017

(54) PROJECTION LENS

(71) Applicants: Sintai Optical (Shenzhen) Co., Ltd., Shenzhen, Guandong Province (CN); Asia Optical Co., Inc., Taichung (TW)

(72) Inventor: Chih-Peng Wang, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 35 days.

(21) Appl. No.: 14/737,630

(22) Filed: Jun. 12, 2015

(65) Prior Publication Data

US 2015/0362709 A1 Dec. 17, 2015

(30) Foreign Application Priority Data

Jun. 17, 2014 (TW) .............................. 103120802 A

(51) Int. Cl.
*G02B 13/16* (2006.01)
*G02B 9/62* (2006.01)
*G02B 13/04* (2006.01)

(52) U.S. Cl.
CPC ............... *G02B 13/16* (2013.01); *G02B 9/62* (2013.01); *G02B 13/04* (2013.01)

(58) Field of Classification Search
CPC .......... G02B 13/06; G02B 13/04; G02B 9/62
USPC .......................... 359/756–757, 761, 649, 651
See application file for complete search history.

(56) References Cited

U.S. PATENT DOCUMENTS

| 6,452,728 B2* | 9/2002 | Shikama | G02B 13/22 359/651 |
| 9,285,564 B2* | 3/2016 | Yamamoto | G02B 13/16 |
| 2013/0141801 A1* | 6/2013 | Yun | G02B 9/62 359/716 |

OTHER PUBLICATIONS

Geary, Joseph M. Introduction to Lens Design: With Practical ZEMAX Examples. Richmond, VA: Willmann-Bell, 2002. p. 23. Print.*

* cited by examiner

*Primary Examiner* — Zachary Wilkes
(74) *Attorney, Agent, or Firm* — McClure, Qualey & Rodack, LLP

(57) ABSTRACT

A projection lens includes a first lens group and a second lens group, all of which are arranged in sequence from a projection side to an image source side along an optical axis. The first lens group is with positive refractive power. The second lens group is with positive refractive power and includes a first lens, a second lens, a third lens and a fourth lens, wherein the first lens is with negative refractive power, the second lens is with positive refractive power, the third lens is with positive refractive power and the fourth lens is with positive refractive power. The first lens and the second lens are cemented together to form a cemented lens, the cemented lens is with negative refractive power. The first lens satisfies: $-0.579 \leq f_1/f \leq -0.4$ wherein $f_1$ is an effective focal length of the first lens and f is an effective focal length of the projection lens.

17 Claims, 20 Drawing Sheets

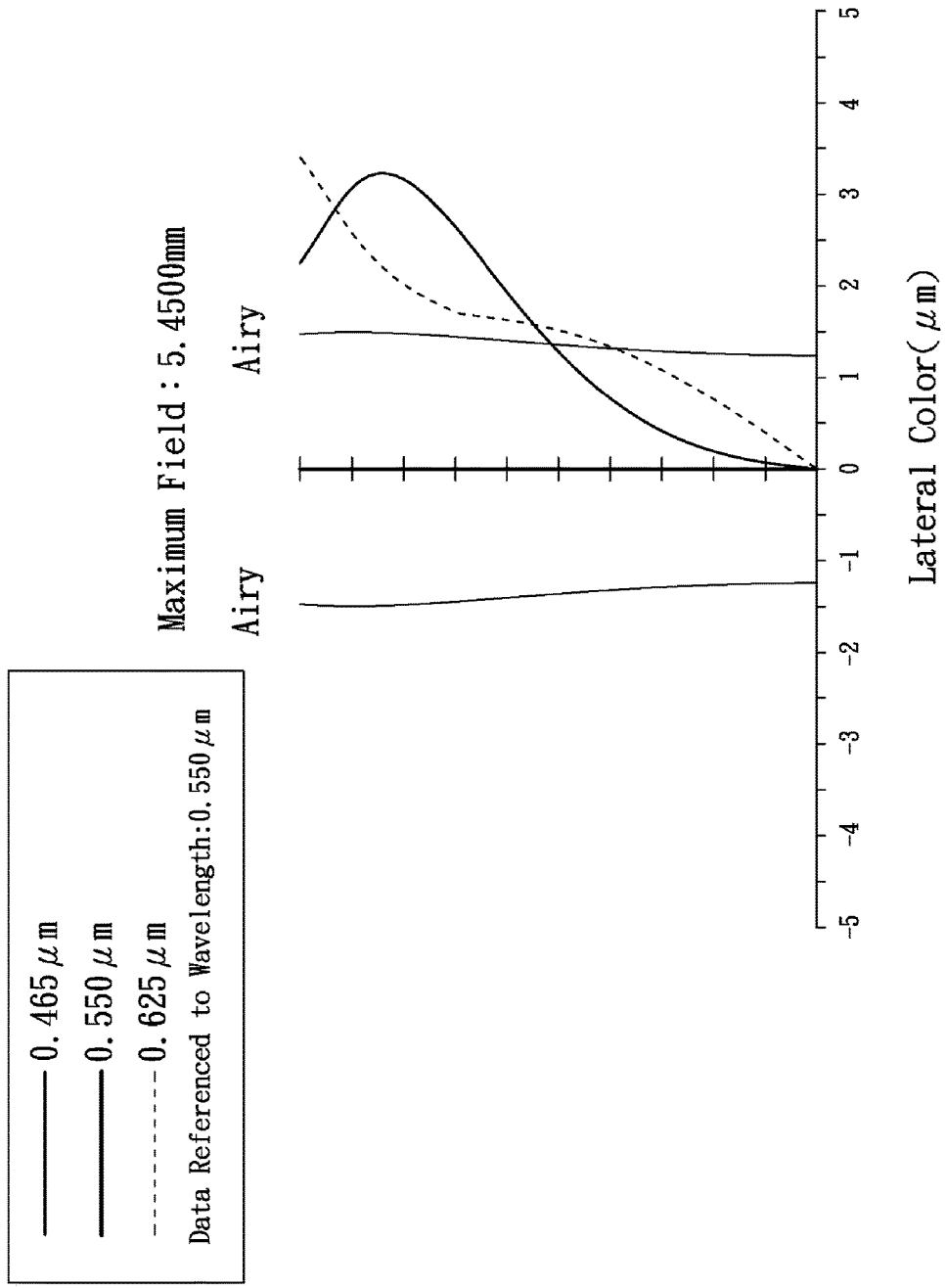

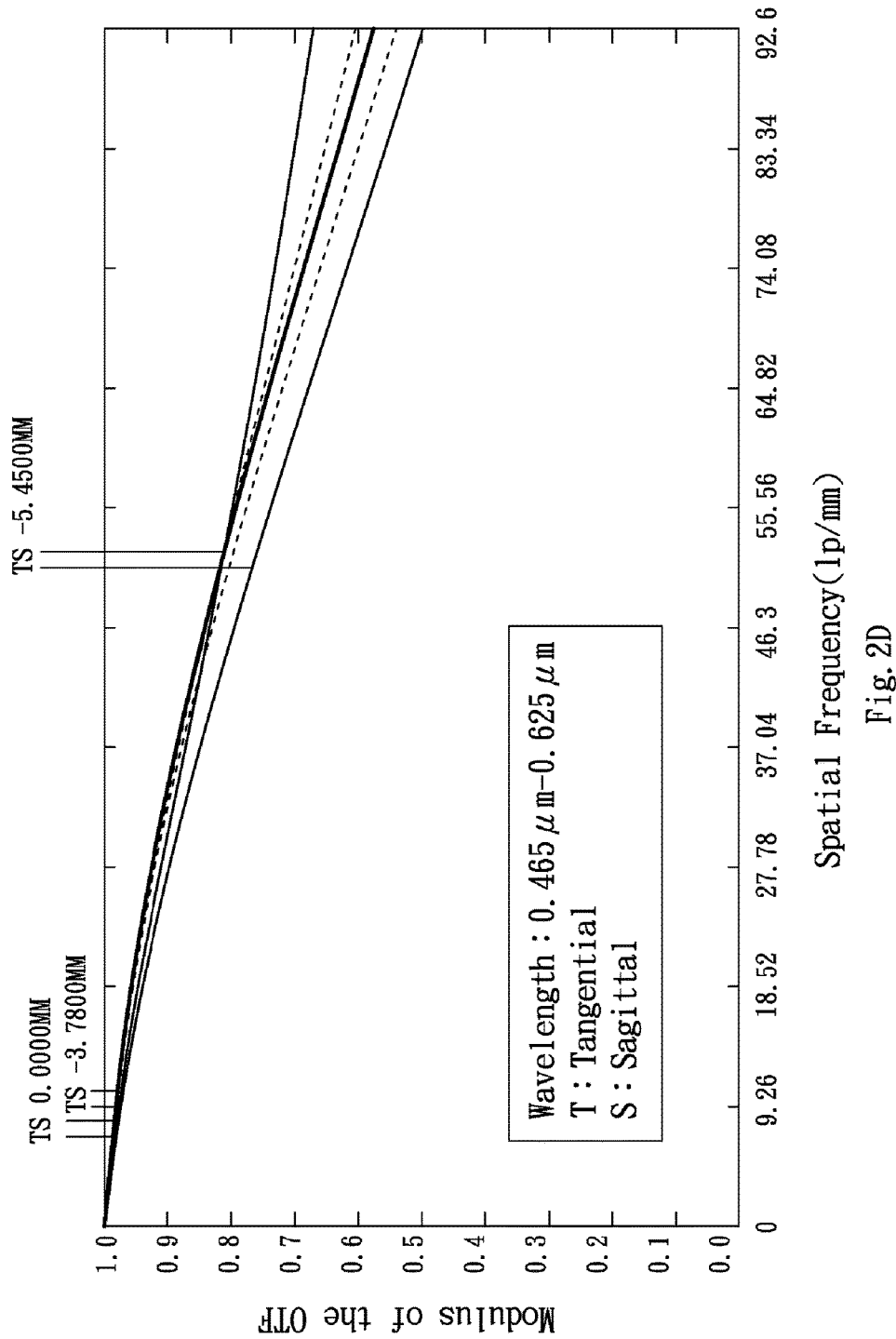

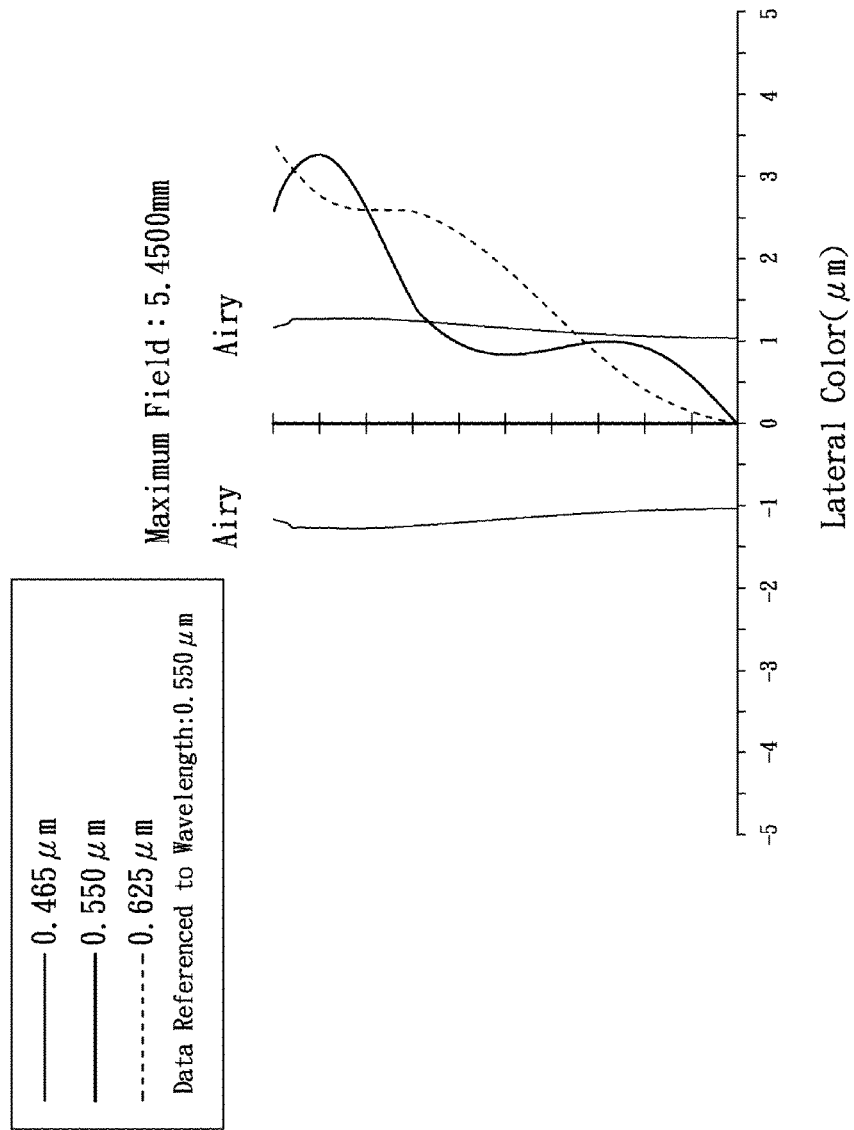

PROJECTION LENS

BACKGROUND OF THE INVENTION

Field of the Invention

The invention relates to a projection lens.

Description of the Related Art

A traditional projector is not easy to carry because of its large volume. In recent years, a projector has been gradually developed toward miniaturization for people to carry conveniently. Thus, the projection lens of a projector also requires miniaturization. However, in order to enhance the luminance of the projector, the projection lens needs to have a larger aperture. Further, in order to project a larger picture in a short projection distance, the projection lens needs to have a smaller throw ratio. Consequently, a traditional projection lens can't meet the requirements of the miniaturized projector. Therefore, a projection lens with miniaturization, larger aperture and smaller throw ratio is required.

BRIEF SUMMARY OF THE INVENTION

The invention provides a projection lens to solve the above problems. The projection lens is provided with characteristics of miniaturization, a larger aperture and a smaller throw ratio, and still has good optical performance and resolution.

The projection lens in accordance with an exemplary embodiment of the invention includes a first lens group and a second lens group, all of which are arranged in sequence from a projection side to an image source side along an optical axis. The first lens group is with positive refractive power. The second lens group is with positive refractive power and includes a first lens, a second lens, a third lens and a fourth lens, all of which are arranged in sequence from the projection side to the image source side along the optical axis, wherein the first lens is with negative refractive power, the second lens is with positive refractive power, the third lens is with positive refractive power and the fourth lens is with positive refractive power. The first lens and the second lens are cemented together to form a cemented lens, the cemented lens is with negative refractive power. The first lens satisfies: $-0.579 \leq f_1/f \leq -0.4$ wherein $f_1$ is an effective focal length of the first lens and f is an effective focal length of the projection lens.

In another exemplary embodiment, the first lens group includes a fifth lens and a sixth lens, all of which are arranged in sequence from the projection side to the image source side along the optical axis, wherein the fifth lens is with negative refractive power and the sixth lens is with positive refractive power.

In yet another exemplary embodiment, the projection lens further includes a prism disposed between the second lens group and the image source side, and satisfies: $0.0094 \leq BFL/TTL \leq 0.118$, $IMGH/TTL \leq 0.148$, $0.268 \leq f/TTL \leq 0.31$ wherein BFL is a distance from an image source side surface of the fourth lens to a projection side surface of the prism along the optical axis, TTL is a distance from an projection side surface of the fifth lens to the image source along the optical axis, IMGH is an image height of the projection lens and f is an effective focal length of the projection lens.

In another exemplary embodiment, the fifth lens satisfies: $-8 \leq f_5/f \leq -3.444$ wherein $f_5$ is an effective focal length of the fifth lens and f is an effective focal length of the projection lens.

In yet another exemplary embodiment, the sixth lens satisfies: $2.093 \leq f_6/f \leq 2.988$ wherein $f_6$ is an effective focal length of the sixth lens and f is an effective focal length of the projection lens.

In another exemplary embodiment, the fifth lens further includes two surfaces, at least one of which is an aspheric surface or both of which are aspheric surfaces.

In yet another exemplary embodiment, the sixth lens further includes two surfaces, at least one of which is an aspheric surface or both of which are aspheric surfaces.

In another exemplary embodiment, the third lens further includes two surfaces, at least one of which is an aspheric surface or both of which are aspheric surfaces.

In yet another exemplary embodiment, the fourth lens further includes two surfaces, at least one of which is an aspheric surface or both of which are aspheric surfaces.

In another exemplary embodiment, the fifth lens, the third lens and the fourth lens are made of plastic material.

In yet another exemplary embodiment, the first lens and the second lens satisfy: $0.849 \leq f_2/f \leq 1.1365$, $-2.7 \leq f_{12}/f \leq -1.4$ wherein $f_2$ is an effective focal length of the second lens, $f_{12}$ is an effective focal length of the combination of the first lens and the second lens and f is an effective focal length of the projection lens.

In another exemplary embodiment, the third lens satisfies: $0.33 \leq f_3/f \leq 1.255$ wherein $f_3$ is an effective focal length of the third lens and f is an effective focal length of the projection lens.

In yet another exemplary embodiment, the fourth lens satisfies: $2.07 \leq f_4/f \leq 2.78$ wherein $f_4$ is an effective focal length of the fourth lens and f is an effective focal length of the projection lens.

In another exemplary embodiment, the first lens is made of glass material.

In yet another exemplary embodiment, the projection lens further includes a stop disposed between the first lens group and the second lens group.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2C is a lateral color diagram of the projection lens in accordance with the first embodiment of the invention;

FIG. 2D is a modulation transfer function diagram of the projection lens in accordance with the first embodiment of the invention;

FIG. 6C is a lateral color diagram of the projection lens in accordance with the third embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
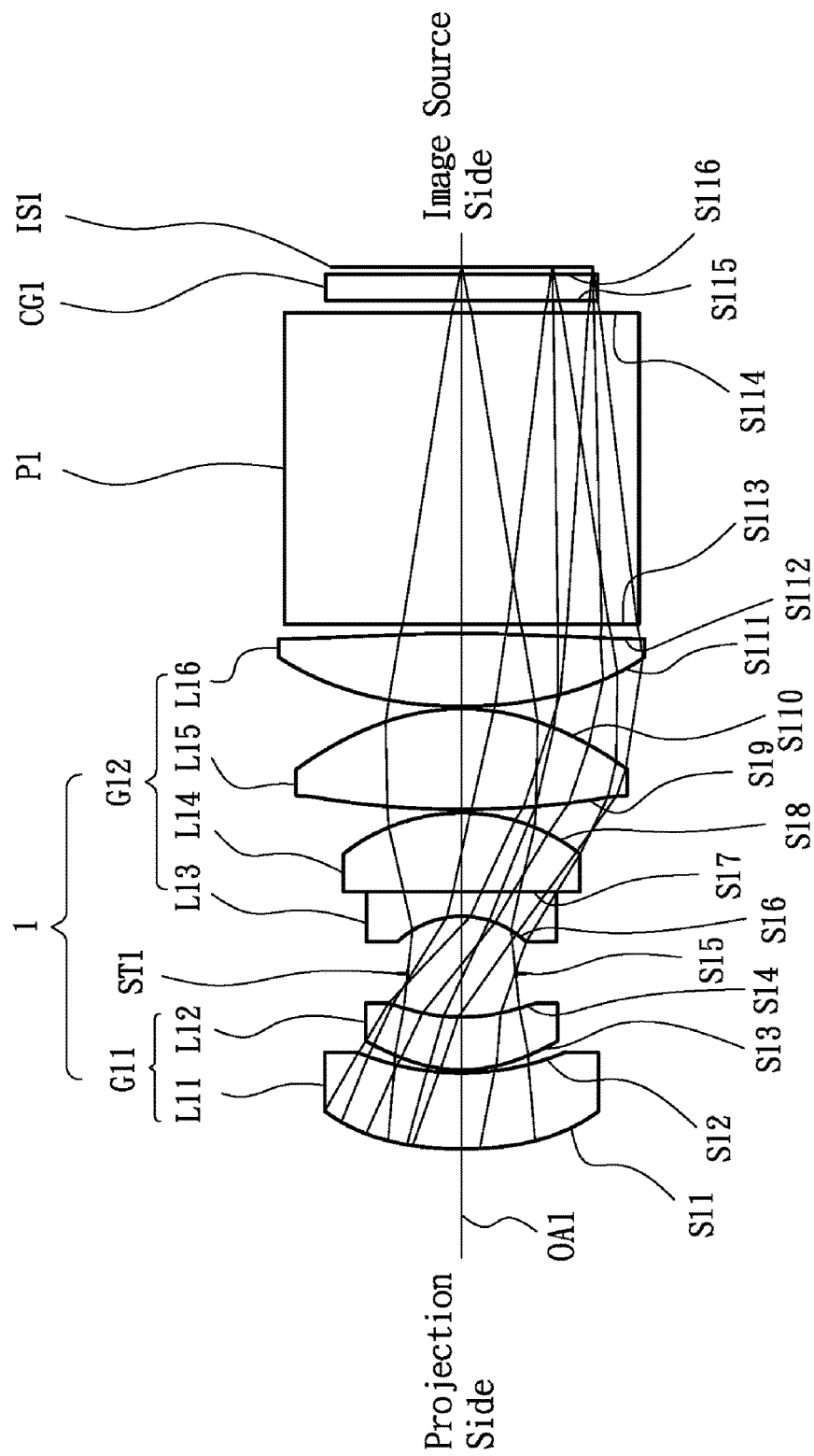
FIG. 1 is a lens layout and optical path diagram of a projection lens in accordance with a first embodiment of the invention.

Referring to FIG. 1, FIG. 1 is a lens layout and optical path diagram of a projection lens in accordance with a first embodiment of the invention. The projection lens 1 includes a first lens group G11, a stop ST1 and a second lens group G12, all of which are arranged in sequence from a projection side to an image source side along an optical axis OA1. In operation, light rays from an image source IS1 are projected on the projection side. The first lens group G11 is with positive refractive power and includes a first lens L11 and a second lens L12, all of which are arranged in sequence from the projection side to the image source side along the optical axis OA1. The first lens L11 is a meniscus lens with negative refractive power, made of plastic material and includes a convex surface S11 facing the projection side and a concave surface S12 facing the image source side, wherein both of the convex surface S11 and concave surface S12 are aspheric surfaces. The second lens L12 is a meniscus lens with positive refractive power, made of glass material and includes a convex surface S13 facing the projection side and a concave surface S14 facing the image source side, wherein both of the convex surface S13 and concave surface S14 are aspheric surfaces. The second lens group G12 is with positive refractive power and includes a third lens L13, a fourth lens L14, a fifth lens L15 and a sixth lens L16, all of which are arranged in sequence from the projection side to the image source side along the optical axis OA1. The third lens L13 is a plano-concave lens with negative refractive power, made of glass material and includes a concave surface S16 facing the projection side, wherein the concave surface S16 is a spherical surface. The fourth lens L14 is a plano-convex lens with positive refractive power, made of glass material and includes a convex surface S18 facing the image source side, wherein the convex surface S18 is a spherical surface. The third lens L13 and the fourth lens L14 are cemented together to form a cemented lens. The cemented lens is with negative refractive power. The fifth lens L15 is a biconvex lens with positive refractive power, made of plastic material and includes a convex surface S19 facing the projection side and a convex surface S110 facing the image source side, wherein both of the convex surface S19 and convex surface S110 are aspheric surfaces. The sixth lens L16 is a biconvex lens with positive refractive power, made of plastic material and includes a convex surface S111 facing the projection side and a convex surface S112 facing the image source side, wherein both of the convex surface S111 and convex surface S112 are aspheric surfaces.

A prism P1 is disposed between the second lens group G12 and the image source IS1. A cover glass CG1 is disposed between the prism P1 and the image source IS1. All of the surfaces S113, S114, S115 and S116 are plane surfaces.

In order to maintain excellent optical performance of the projection lens in accordance with the first embodiment of the invention, the projection lens 1 must satisfies the following ten conditions:

$$0.579 \leq fl_3/fl \leq -0.4 \tag{1}$$

$$0.0094 \leq BFL1/TTL1 \leq 0.118 \tag{2}$$

$$IMGH1/TTL1 \leq 0.148 \tag{3}$$

$$0.268 \leq fl/TTL1 \leq 0.31 \tag{4}$$

$$-8 \leq fl_1/fl \leq -3.444 \tag{5}$$

$$2.093 \leq fl_2/fl \leq 2.988 \tag{6}$$

$$0.849 \leq fl_4/fl \leq 1.1365 \tag{7}$$

$$-2.7 \leq fl_{34}/fl \leq -1.4 \tag{8}$$

$$0.33 \leq fl_5/fl \leq 1.255 \tag{9}$$

$$2.07 \leq fl_6/fl \leq 2.78 \tag{10}$$

wherein $fl_3$ is an effective focal length of the third lens L13, fl is an effective focal length of the projection lens 1, BFL1 is a distance from the convex surface S112 of the sixth lens L16 to the projection side surface S113 of the prism P1 along the optical axis OA1, TTL1 is a distance from the convex surface S11 of the first lens L11 to the image source IS1 along the optical axis OA1, IMGH1 is an image height of the projection lens 1, $fl_1$ is an effective focal length of the first lens L11, $fl_2$ is an effective focal length of the second lens L12, $fl_4$ is an effective focal length of the fourth lens L14, $fl_{34}$ is an effective focal length of the combination of the third lens L13 and the fourth lens L14, $fl_5$ is an effective focal length of the fifth lens L15 and $fl_6$ is an effective focal length of the sixth lens L16.

By the above design of the lenses and stop ST1, the projection lens 1 is provided with a shortened total lens length, a decreased F-number, a decreased throw ratio, an effective corrected aberration and an increased resolution.

In order to achieve the above purpose and effectively enhance the optical performance, the projection lens 1 in accordance with the first embodiment of the invention is provided with the optical specifications shown in Table 1, which include the effective focal length, F-number, throw ratio, total lens length, radius of curvature of each lens surface, thickness between adjacent surface, refractive index of each lens and Abbe number of each lens. Table 1 shows that the effective focal length is equal to 11.4 mm, F-number is equal to 1.85, throw ratio is equal to 1.65 and total lens length is equal to 36.8124 mm for the projection lens 1 of the first embodiment of the invention.

TABLE 1

Effective Focal Length = 11.4 mm
F-number = 1.85
Throw Ratio = 1.65
Total Lens Length = 36.8124 mm

| Surface Number | Radius of Curvature (mm) | Thickness (mm) | Nd | Vd | Remark |
|---|---|---|---|---|---|
| S11 | 16.774 | 3.189 | 1.53 | 56.07 | The First Lens L11 |
| S12 | 11.660 | 0.107 | | | |
| S13 | 6.079 | 2.200 | 1.84 | 23.82 | The Second Lens L12 |
| S14 | 7.218 | 1.818 | | | |
| S15 | ∞ | 2.406 | | | Stop ST1 |
| S16 | −3.886 | 1.008 | 1.84 | 23.82 | The Third Lens L13 |
| S17 | ∞ | 3.317 | 1.81 | 46.62 | The Fourth Lens L14 |
| S18 | −7.922 | 0.122 | | | |
| S19 | 29.079 | 4.206 | 1.53 | 56.07 | The Fifth Lens L15 |
| S110 | −9.322 | 0.100 | | | |
| S111 | 18.375 | 3.038 | 1.53 | 56.07 | The Sixth Lens L16 |
| S112 | −64.246 | 0.400 | | | |
| S113 | ∞ | 13 | 1.74 | 49.22 | Prism P1 |
| S114 | ∞ | 0.5 | | | |
| S115 | ∞ | 1.1 | 1.50 | 61.61 | Cover Glass CG1 |
| S116 | ∞ | 0.3 | | | |

The aspheric surface sag z of each lens in table 1 can be calculated by the following formula:

$$z = ch^2 / \{1 + [1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each surface are shown in Table 2.

TABLE 2

| Surface Number | k | A | B | C | D | E |
|---|---|---|---|---|---|---|
| S11 | 5.0557E+00 | 5.8438E−04 | −1.2589E−05 | 1.9912E−07 | −2.6761E−09 | 2.7457E−12 |
| S12 | 2.7905E+00 | 1.3290E−04 | −3.9084E−05 | 5.8789E−07 | 9.3087E−09 | 9.8224E−12 |
| S13 | −1.1250E+00 | −1.0966E−04 | −2.4639E−05 | 4.6756E−07 | 0.0000E+00 | 0.0000E+00 |
| S14 | −1.4889E+00 | −3.0286E−04 | −2.6314E−05 | −9.1856E−07 | 0.0000E+00 | 0.0000E+00 |
| S19 | −3.5578E+01 | 4.9961E−06 | 6.7542E−07 | −7.3136E−09 | −7.0093E−11 | 2.3571E−13 |
| S110 | 4.7415E−02 | 1.6022E−04 | 1.1273E−06 | 1.6540E−08 | −9.7209E−12 | −9.1563E−14 |
| S111 | 1.2657E+00 | 9.4695E−05 | −3.4377E−07 | 1.5525E−09 | 1.0998E−12 | 0.0000E+00 |
| S112 | −7.1897E+01 | 6.0104E−05 | −2.4976E−07 | 2.1497E−10 | 3.2602E−12 | 0.0000E+00 |

For the projection lens 1 of the first embodiment, the effective focal length $fl_3$ of the third lens L13 is equals to −4.552 mm, the effective focal length fl of the projection lens 1 is equal to 11.4 mm, the distance BFL1 from the convex surface S112 of the sixth lens L16 to the projection side surface S113 of the prism P1 along the optical axis OA1 is equal to 0.4 mm, the distance TTL1 from the convex surface S11 of the first lens L11 to the image source IS1 along the optical axis OA1 is equal to 36.8124 mm, the image height IMGH1 of the projection lens 1 is equal to 5.45 mm, the effective focal length $fl_1$ of the first lens L11 is equal to −91.104 mm, the effective focal length $fl_2$ of the second lens L12 is equal to 23.862 mm, the effective focal length $fl_4$ of the fourth lens L14 is equal to 9.67 mm, the effective focal length $fl_{34}$ of the combination of the third lens L13 and the fourth lens L14 is equal to −16 mm, the effective focal length $fl_5$ of the fifth lens L15 is equal to 13.678 mm and the effective focal length $fl_6$ of the sixth lens L16 is equal to 26.972 mm. According to the above data, the following values can be obtained:

$fl_3/fl = -0.4$, $BFL1/TTL1 = 0.0109$, $IMGH1/TTL1 = 0.148$, $fl/TTL1 = 0.31$, $fl_1/fl = -8$, $fl_2/fl = 2.093$, $fl_4/fl = 0.849$, $fl_{34}/fl = -1.4$, $fl_5/fl = 1.2$, $fl_6/fl = 2.366$ which respectively satisfy the above conditions (1)-(10).

Figure 2A:
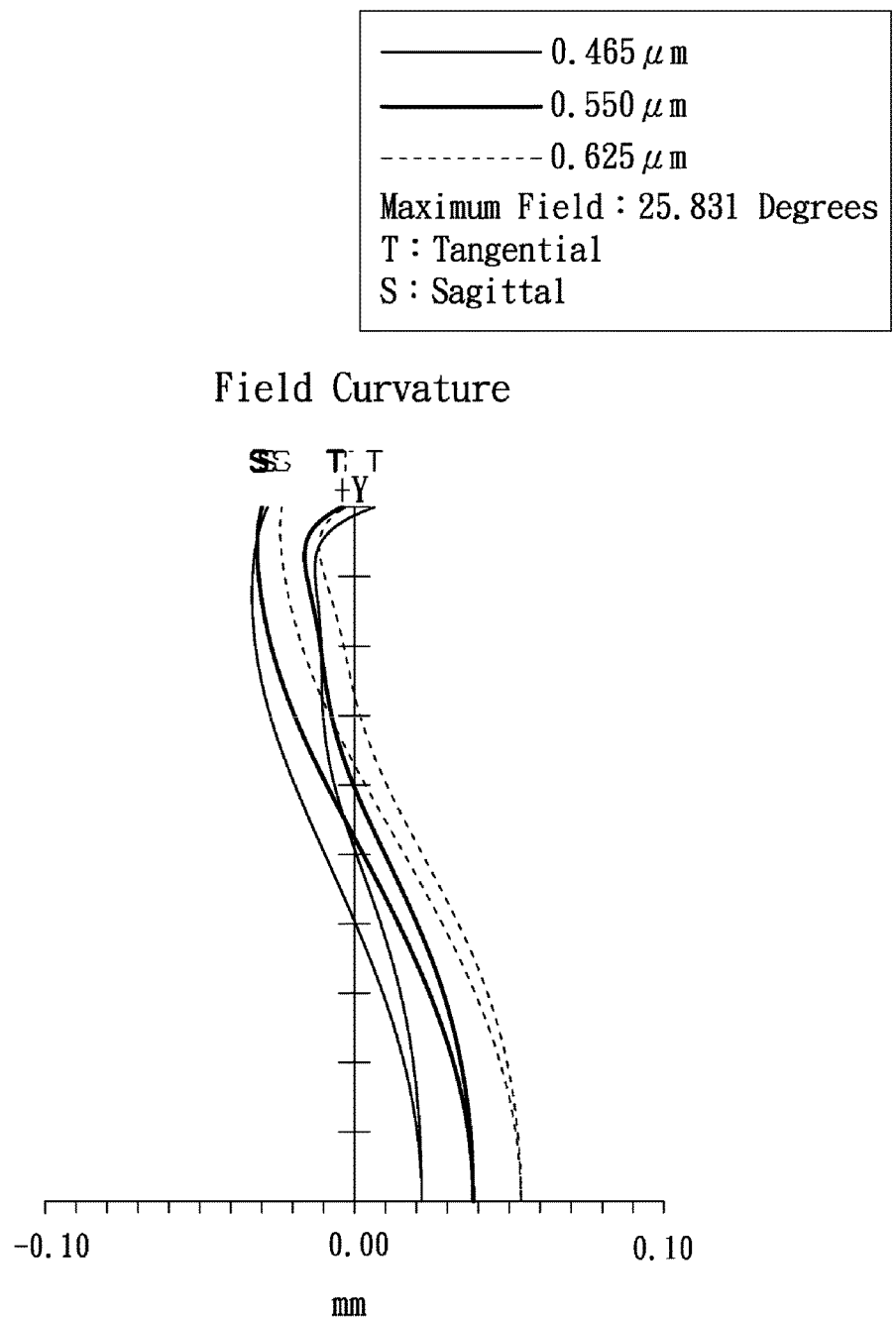
FIG. 2A is a field curvature diagram of the projection lens in accordance with the first embodiment of the invention.
Figure 2B:
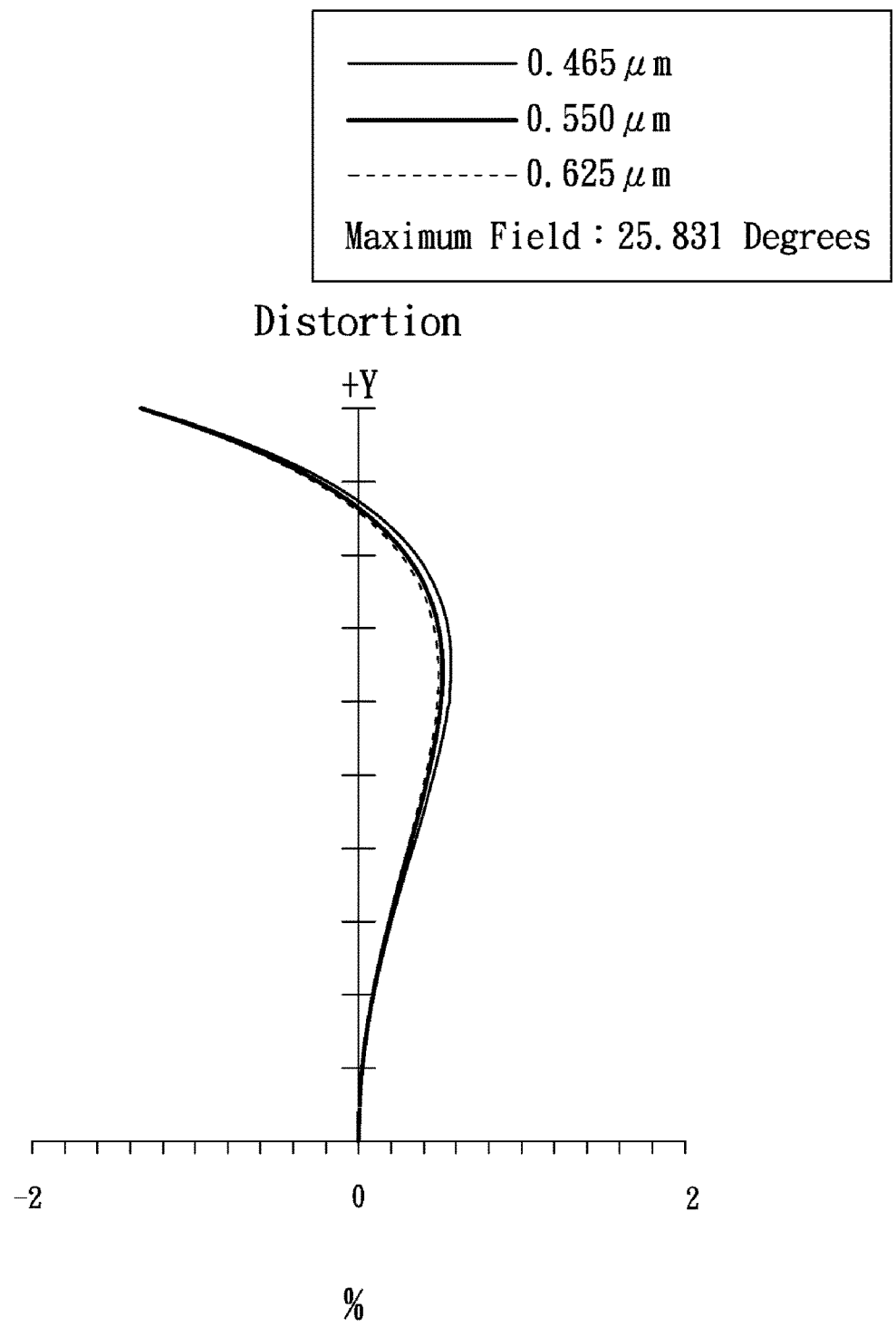
FIG. 2B is a distortion diagram of the projection lens in accordance with the first embodiment of the invention.

By the above arrangements of the lenses and stop ST1, the projection lens 1 of the first embodiment can meet the requirements of optical performance as seen in FIGS. 2A-2D, wherein FIG. 2A shows the field curvature diagram of the projection lens 1 of the first embodiment, FIG. 2B shows the distortion diagram of the projection lens 1 of the first embodiment, FIG. 2C shows the lateral color diagram of the projection lens 1 of the first embodiment and FIG. 2D shows the modulation transfer function diagram of the projection lens 1 of the first embodiment.

It can be seen from FIG. 2A that the field curvature of tangential direction and sagittal direction in the first embodiment ranges between −0.04 mm and 0.06 mm for the wavelength of 0.465 μm, 0.550 μm, and 0.625 μm. It can be seen from FIG. 2B that the distortion in the first embodiment ranges between −1.4% and 0.6% for the wavelength of 0.465 μm, 0.550 μm, and 0.625 μm. It can be seen from FIG. 2C that the lateral color of different fields in the first embodiment ranges between 0.0 μm and 3.5 μm for the wavelength of 0.465 μm, 0.550 μm, and 0.625 μm. It can be seen from FIG. 2D that the modulation transfer function of tangential direction and sagittal direction in the first embodiment ranges between 0.50 and 1.0 for the wavelength ranges between 0.465 μm and 0.625 μm, each field is 0.0000 mm, −3.7800 mm, and −5.4500 mm, spatial frequency ranges between 0 lp/mm and 92.6 lp/mm. It is obvious that the field curvature, the distortion and the lateral color of the projection lens 1 of the first embodiment can be corrected effectively, and the resolution of the projection lens 1 of the first embodiment can meet the requirement. Therefore, the projection lens 1 of the first embodiment is capable of good optical performance.

Figure 3:
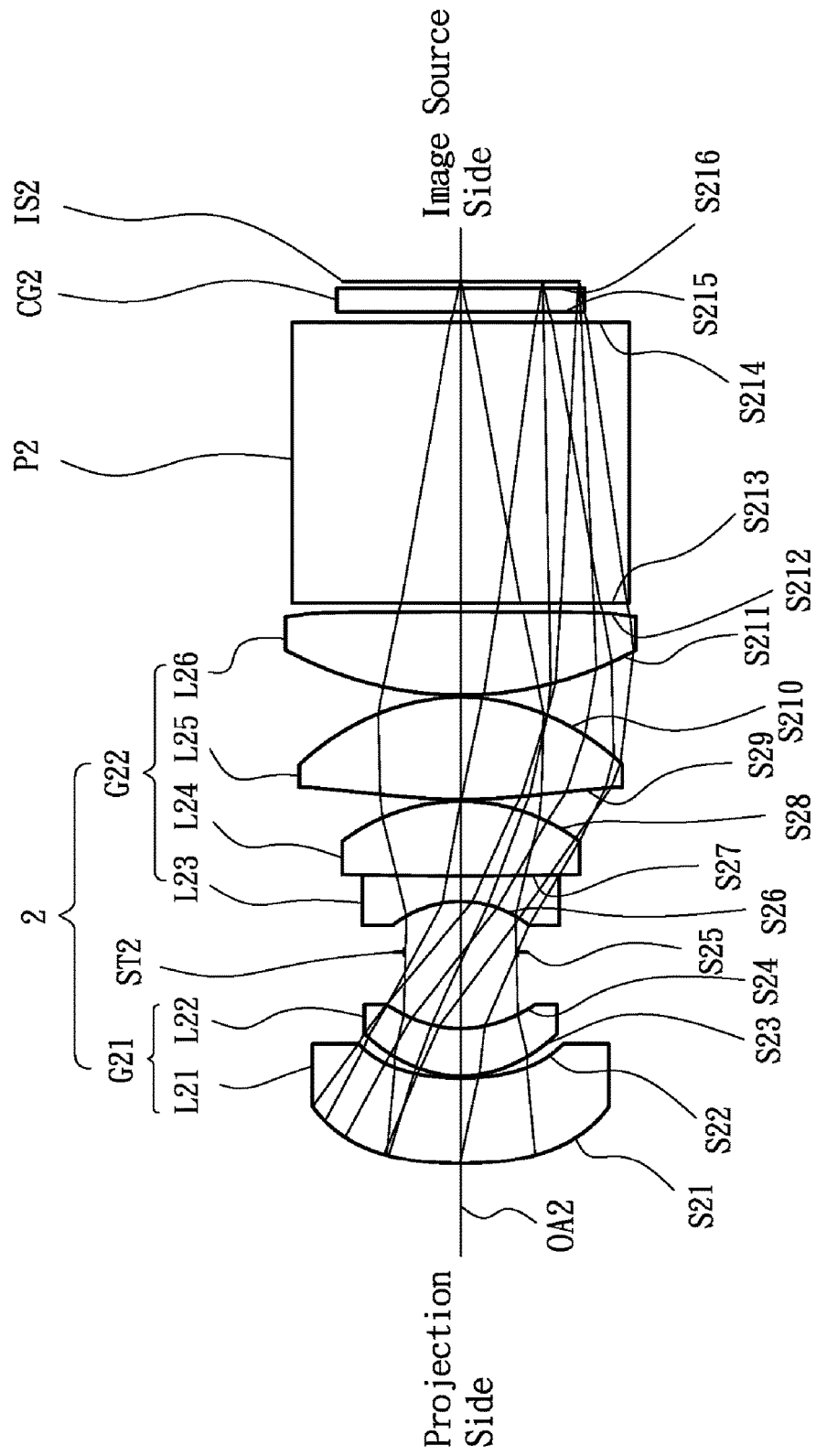
FIG. 3 is a lens layout and optical path diagram of a projection lens in accordance with a second embodiment of the invention.

Referring to FIG. 3, FIG. 3 is a lens layout and optical path diagram of a projection lens in accordance with a second embodiment of the invention. The projection lens 2 includes a first lens group G21, a stop ST2 and a second lens group G22, all of which are arranged in sequence from a projection side to an image source side along an optical axis OA2. In operation, light rays from an image source IS2 are projected on the projection side. The first lens group G21 is with positive refractive power and includes a first lens L21 and a second lens L22, all of which are arranged in sequence from the projection side to the image source side along the optical axis OA2. The first lens L21 is a meniscus lens with negative refractive power, made of plastic material and includes a convex surface S21 facing the projection side and a concave surface S22 facing the image source side, wherein both of the convex surface S21 and concave surface S22 are aspheric surfaces. The second lens L22 is a meniscus lens with positive refractive power, made of glass material and includes a convex surface S23 facing the projection side and a concave surface S24 facing the image source side, wherein both of the convex surface S23 and concave surface S24 are aspheric surfaces. The second lens group G22 is with positive refractive power and includes a third lens L23, a fourth lens L24, a fifth lens L25 and a sixth lens L26, all of which are arranged in sequence from the projection side to the image source side along the optical axis OA2. The third lens L23 is a biconcave lens with negative refractive power, made of glass material and includes a concave surface S26 facing the projection side, wherein the concave surface S26 is a spherical surface. The fourth lens L24 is a biconvex lens with positive refractive power, made of glass material and includes a convex surface S28 facing the image source side, wherein the convex surface S28 is a spherical surface. The third lens L23 and the fourth lens L24 are cemented together to form a cemented lens. The cemented lens is with negative refractive power. The fifth lens L25 is a biconvex lens with positive refractive power, made of plastic material and includes a convex surface S29 facing the projection side and a convex surface S210 facing the image source side, wherein both of the convex surface S29 and convex surface S210 are aspheric surfaces. The sixth lens L26 is a biconvex lens with positive refractive power, made of plastic material and includes a convex surface S211 facing the projection side and a convex surface S212 facing the image source side, wherein both of the convex surface S211 and convex surface S212 are aspheric surfaces.

A prism P2 is disposed between the second lens group G22 and the image source IS2. A cover glass CG2 is disposed between the prism P2 and the image source IS2. All of the surfaces S213, S214, S215 and S216 are plane surfaces.

In order to maintain excellent optical performance of the projection lens in accordance with the second embodiment of the invention, the projection lens 2 must satisfies the following ten conditions:

$$-0.579 \leq f2_3/f2 \leq -0.4 \quad (11)$$

$$0.0094 \leq BFL2/TTL2 \leq 0.118 \quad (12)$$

$$IMGH2/TTL2 \leq 0.148 \quad (13)$$

$$0.268 \leq f2/TTL2 \leq 0.31 \quad (14)$$

$$-8 \leq f2_1/f2 \leq -3.444 \quad (15)$$

$$2.093 \leq f2_2/f2 \leq 2.988 \quad (16)$$

$$0.849 \leq f2_4/f2 \leq 1.1365 \quad (17)$$

$$-2.7 \leq f2_{34}/f2 \leq -1.4 \quad (18)$$

$$0.33 \leq f2_5/f2 \leq 1.255 \quad (19)$$

$$2.07 \leq f2_6/f2 \leq 2.78 \quad (20)$$

wherein $f2_3$ is an effective focal length of the third lens L23, f2 is an effective focal length of the projection lens 2, BFL2 is a distance from the convex surface S212 of the sixth lens L26 to the projection side surface S213 of the prism P2 along the optical axis OA2, TTL2 is a distance from the convex surface S21 of the first lens L21 to the image source IS2 along the optical axis OA2, IMGH2 is an image height of the projection lens 2, $f2_1$ is an effective focal length of the first lens L21, $f2_2$ is an effective focal length of the second lens L22, $f2_4$ is an effective focal length of the fourth lens L24, $f2_{34}$ is an effective focal length of the combination of the third lens L23 and the fourth lens L24, $f2_5$ is an effective focal length of the fifth lens L25 and $f2_6$ is an effective focal length of the sixth lens L26.

By the above design of the lenses and stop ST2, the projection lens 2 is provided with a shortened total lens length, a decreased F-number, a decreased throw ratio, an effective corrected aberration and an increased resolution.

In order to achieve the above purpose and effectively enhance the optical performance, the projection lens 2 in accordance with the second embodiment of the invention is provided with the optical specifications shown in Table 3, which include the effective focal length, F-number, throw ratio, total lens length, radius of curvature of each lens surface, thickness between adjacent surface, refractive index of each lens and Abbe number of each lens. Table 3 shows that the effective focal length is equal to 11.4 mm, F-number is equal to 1.65, throw ratio is equal to 1.65 and total lens length is equal to 40.8706 mm for the projection lens 2 of the second embodiment of the invention.

TABLE 3

Effective Focal Length = 11.4 mm
F-number = 1.65
Throw Ratio = 1.65
Total Lens Length = 40.8706 mm

| Surface Number | Radius of Curvature (mm) | Thickness (mm) | Nd | Vd | Remark |
| --- | --- | --- | --- | --- | --- |
| S21 | 20.883 | 3.948 | 1.53 | 56.07 | The First Lens L21 |
| S22 | 11.099 | 0.100 | | | |
| S23 | 5.273 | 2.200 | 1.84 | 23.82 | The Second Lens L22 |
| S24 | 5.350 | 3.536 | | | |
| S25 | ∞ | 2.334 | | | Stop ST2 |
| S26 | −5.071 | 1.200 | 1.84 | 23.82 | The Third Lens L23 |
| S27 | 146.441 | 3.461 | 1.81 | 46.62 | The Fourth Lens L24 |
| S28 | −9.037 | 0.100 | | | |
| S29 | 29.406 | 4.716 | 1.53 | 56.07 | The Fifth Lens L25 |
| S210 | −9.545 | 0.100 | | | |
| S211 | 17.466 | 3.875 | 1.53 | 56.07 | The Sixth Lens L26 |
| S212 | −437.397 | 0.400 | | | |
| S213 | ∞ | 13 | 1.74 | 49.22 | Prism P2 |
| S214 | ∞ | 0.5 | | | |
| S215 | ∞ | 1.1 | 1.50 | 61.61 | Cover Glass CG2 |
| S216 | ∞ | 0.3 | | | |

The aspheric surface sag z of each lens in table 3 can be calculated by the following formula:

$$z=ch^2/\{1+[1-(k+1)c^2h^2]^{1/2}\}+Ah^4+Bh^6+Ch^8+Dh^{10}+Eh^{12}$$

where c is curvature, h is the vertical distance from the lens surface to the optical axis, k is conic constant and A, B, C, D and E are aspheric coefficients.

In the second embodiment, the conic constant k and the aspheric coefficients A, B, C, D, E of each surface are shown in Table 4.

TABLE 4

| Surface Number | k | A | B | C | D | E |
|---|---|---|---|---|---|---|
| S21 | 6.3972E+00 | 6.9066E−04 | −1.1468E−05 | 2.4488E−07 | −2.5913E−09 | 1.4982E−11 |
| S22 | 2.6989E+00 | 4.4014E−04 | −5.2109E−07 | 3.7665E−07 | 0.0000E+00 | 0.0000E+00 |
| S23 | −1.1020E+00 | −1.6542E−05 | 7.2403E−06 | 4.8321E−07 | 0.0000E+00 | 0.0000E+00 |
| S24 | −1.5775E+00 | 2.1374E−04 | 1.0688E−05 | 5.8529E−07 | 0.0000E+00 | 0.0000E+00 |
| S29 | −1.5124E+01 | −6.4975E−05 | 2.6856E−07 | −5.4520E−09 | −7.4682E−11 | 3.4106E−14 |
| S210 | 8.7978E−02 | 1.3607E−04 | 3.3736E−07 | 8.4816E−09 | 1.0038E−11 | 1.3157E−13 |
| S211 | 2.7252E−02 | 5.1950E−05 | −2.3653E−07 | −1.6078E−08 | −2.5710E−12 | −6.7751E−13 |
| S212 | −6.8870E+01 | 3.1248E−05 | −4.4628E−07 | −8.3732E−09 | −7.4906E−11 | 6.8017E−13 |

For the projection lens 2 of the second embodiment, the effective focal length $f2_3$ of the third lens L23 is equals to −5.717 mm, the effective focal length f2 of the projection lens 2 is equal to 11.4 mm, the distance BFL2 from the convex surface S212 of the sixth lens L26 to the projection side surface S213 of the prism P2 along the optical axis OA2 is equal to 0.4 mm, the distance TTL2 from the convex surface S21 of the first lens L21 to the image source IS2 along the optical axis OA2 is equal to 40.8706 mm, the image height IMGH2 of the projection lens 2 is equal to 5.45 mm, the effective focal length $f2_1$ of the first lens L21 is equal to −51.384 mm, the effective focal length $f2_2$ of the second lens L22 is equal to 30.29 mm, the effective focal length $f2_4$ of the fourth lens L24 is equal to 10.488 mm, the effective focal length $f2_{34}$ of the combination of the third lens L23 and the fourth lens L24 is equal to −25.644 mm, the effective focal length $f2_5$ of the fifth lens L25 is equal to 14.021 mm and the effective focal length $f2_6$ of the sixth lens L26 is equal to 31.39 mm. According to the above data, the following values can be obtained:

$f2_3/f2=-0.515$, $BFL2/TTL2=0.00979$, $IMGH2/TTL2=0.1333$, $f2/TTL2=0.279$, $f2_1/f2=-4.507$, $f2_2/f2=2.657$, $f2_4/f2=0.92$, $f2_{34}/f2=-2.25$, $f2_5/f2=1.23$, $f2_6/f2=2.754$ which respectively satisfy the above conditions (11)-(20).

Figure 4A:
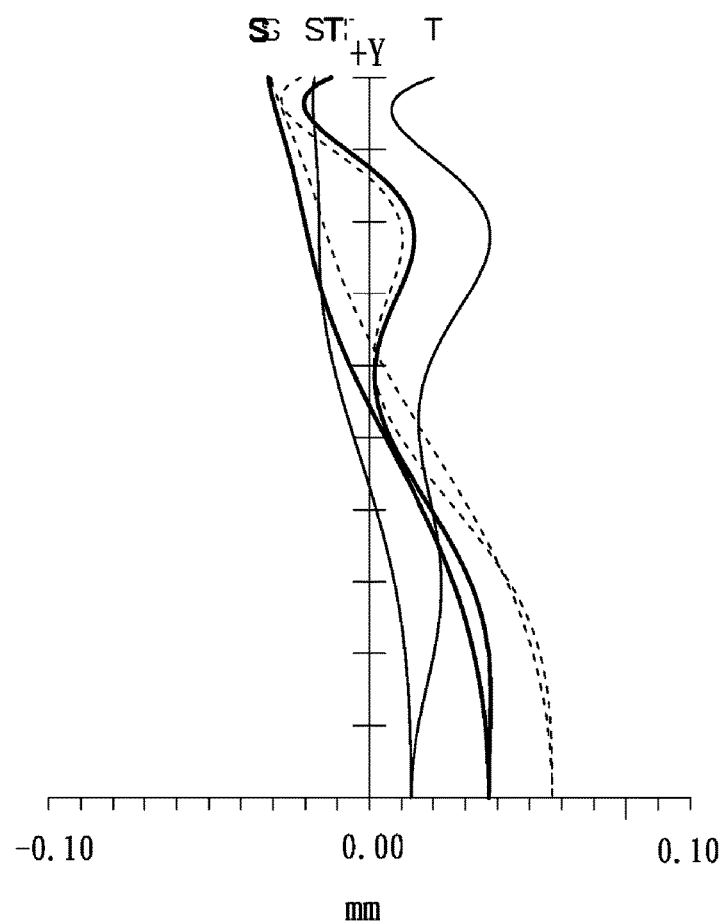
FIG. 4A is a field curvature diagram of the projection lens in accordance with the second embodiment of the invention.
Figure 4B:
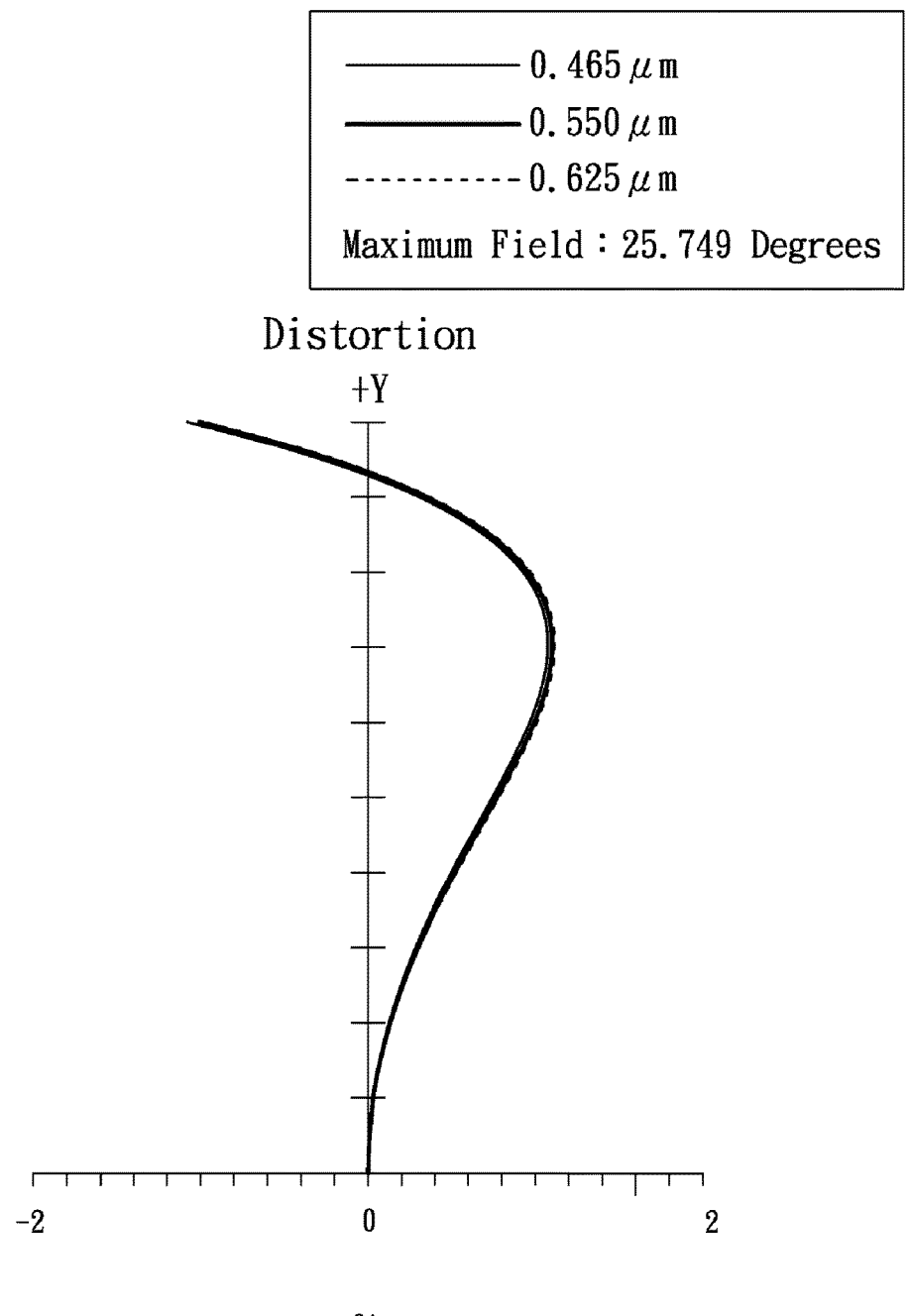
FIG. 4B is a distortion diagram of the projection lens in accordance with the second embodiment of the invention.
Figure 4C:
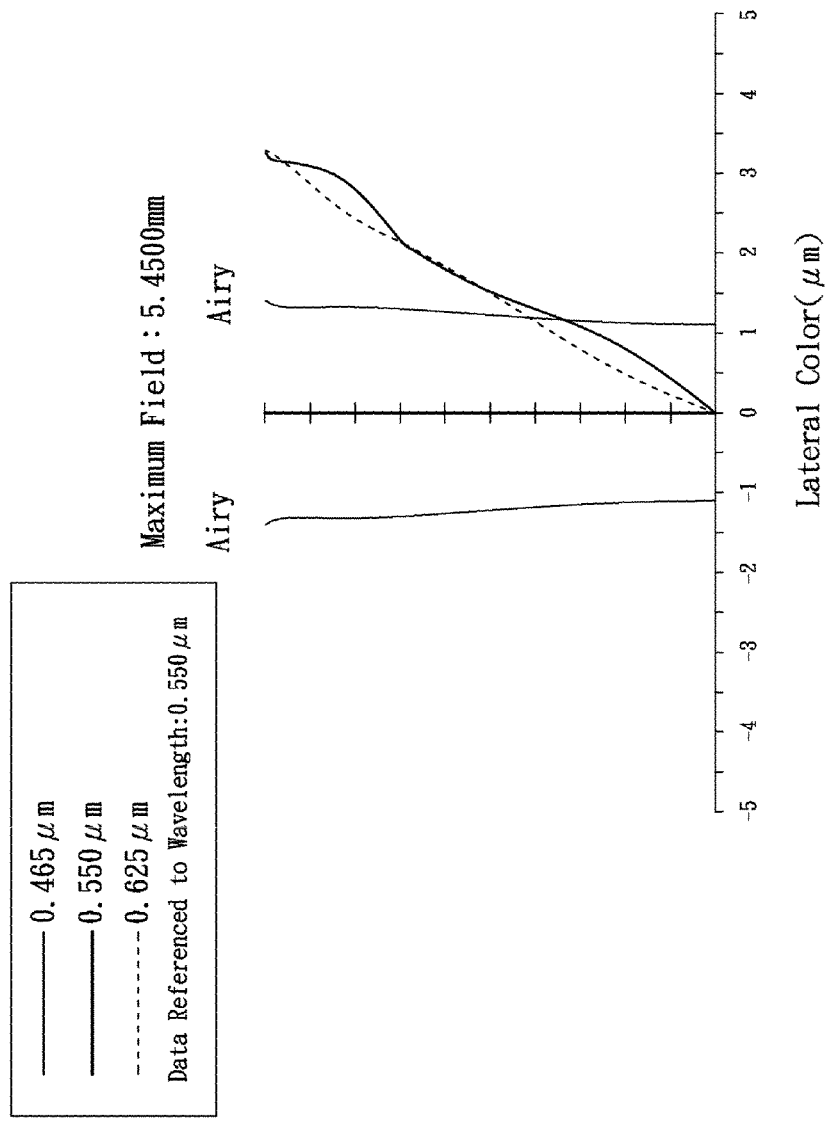
FIG. 4C is a lateral color diagram of the projection lens in accordance with the second embodiment of the invention.
Figure 4D:
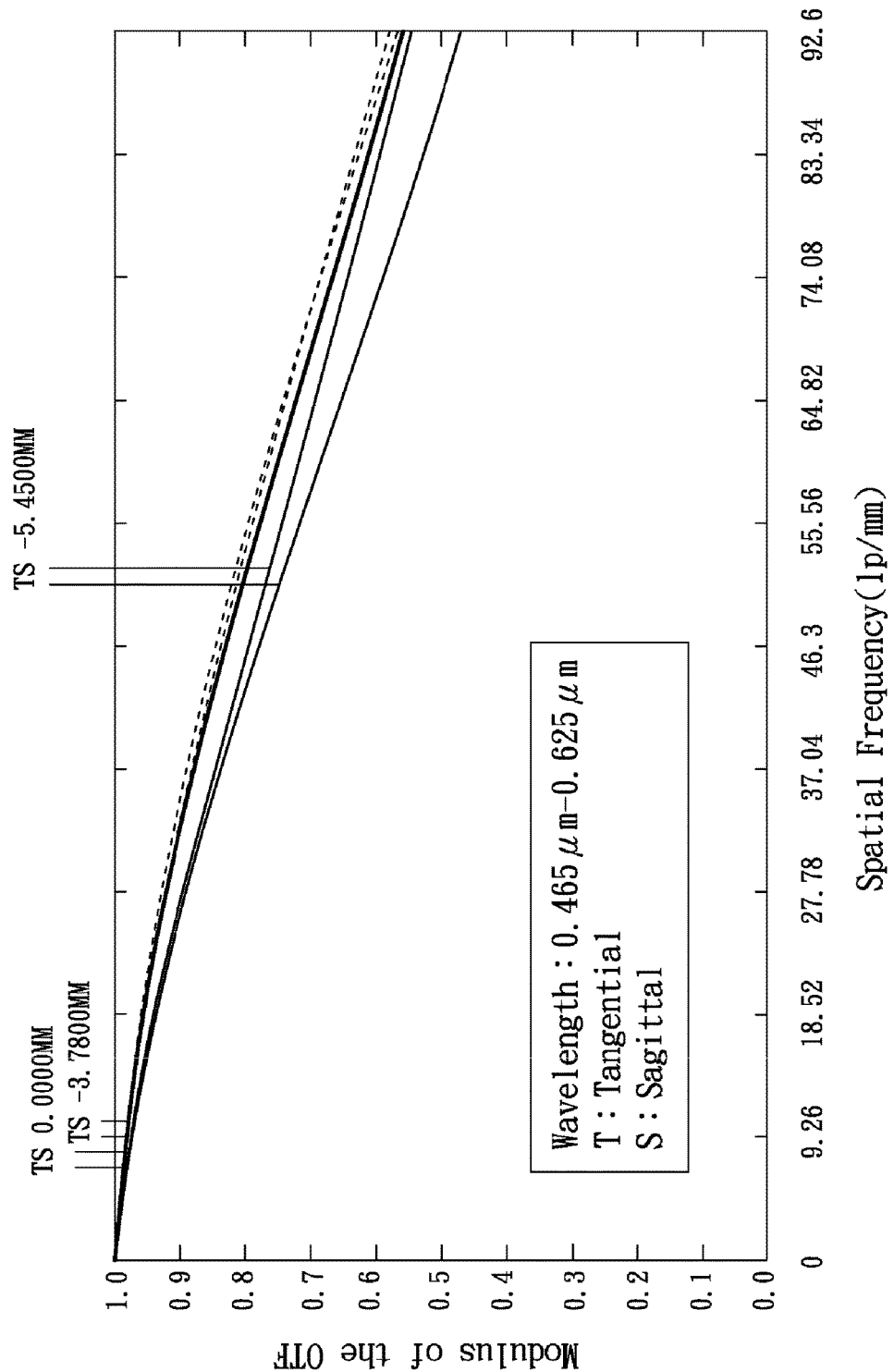
FIG. 4D is a modulation transfer function diagram of the projection lens in accordance with the second embodiment of the invention.

By the above arrangements of the lenses and stop ST2, the projection lens 2 of the second embodiment can meet the requirements of optical performance as seen in FIGS. 4A-4D, wherein FIG. 4A shows the field curvature diagram of the projection lens 2 of the second embodiment, FIG. 4B shows the distortion diagram of the projection lens 2 of the second embodiment, FIG. 4C shows the lateral color diagram of the projection lens 2 of the second embodiment and FIG. 4D shows the modulation transfer function diagram of the projection lens 2 of the second embodiment.

It can be seen from FIG. 4A that the field curvature of tangential direction and sagittal direction in the second embodiment ranges between −0.04 mm and 0.06 mm for the wavelength of 0.465 μm, 0.550 μm, and 0.625 μm. It can be seen from FIG. 4B (the three lines in the figure almost coincide to appear as if a signal line) that the distortion in the second embodiment ranges between −1.2% and 1.2% for the wavelength of 0.465 μm, 0.550 μm, and 0.625 μm. It can be seen from FIG. 4C that the lateral color of different fields in the second embodiment ranges between 0.0 μm and 3.5 μm for the wavelength of 0.465 μm, 0.550 μm, and 0.625 μm. It can be seen from FIG. 4D that the modulation transfer function of tangential direction and sagittal direction in the second embodiment ranges between 0.46 and 1.0 for the wavelength ranges between 0.465 μm and 0.625 μm, each field is 0.0000 mm, −3.7800 mm, and −5.4500 mm, spatial frequency ranges between 0 lp/mm and 92.6 lp/mm. It is obvious that the field curvature, the distortion and the lateral color of the projection lens 2 of the second embodiment can be corrected effectively, and the resolution of the projection lens 2 of the second embodiment can meet the requirement. Therefore, the projection lens 2 of the second embodiment is capable of good optical performance.

Figure 5:
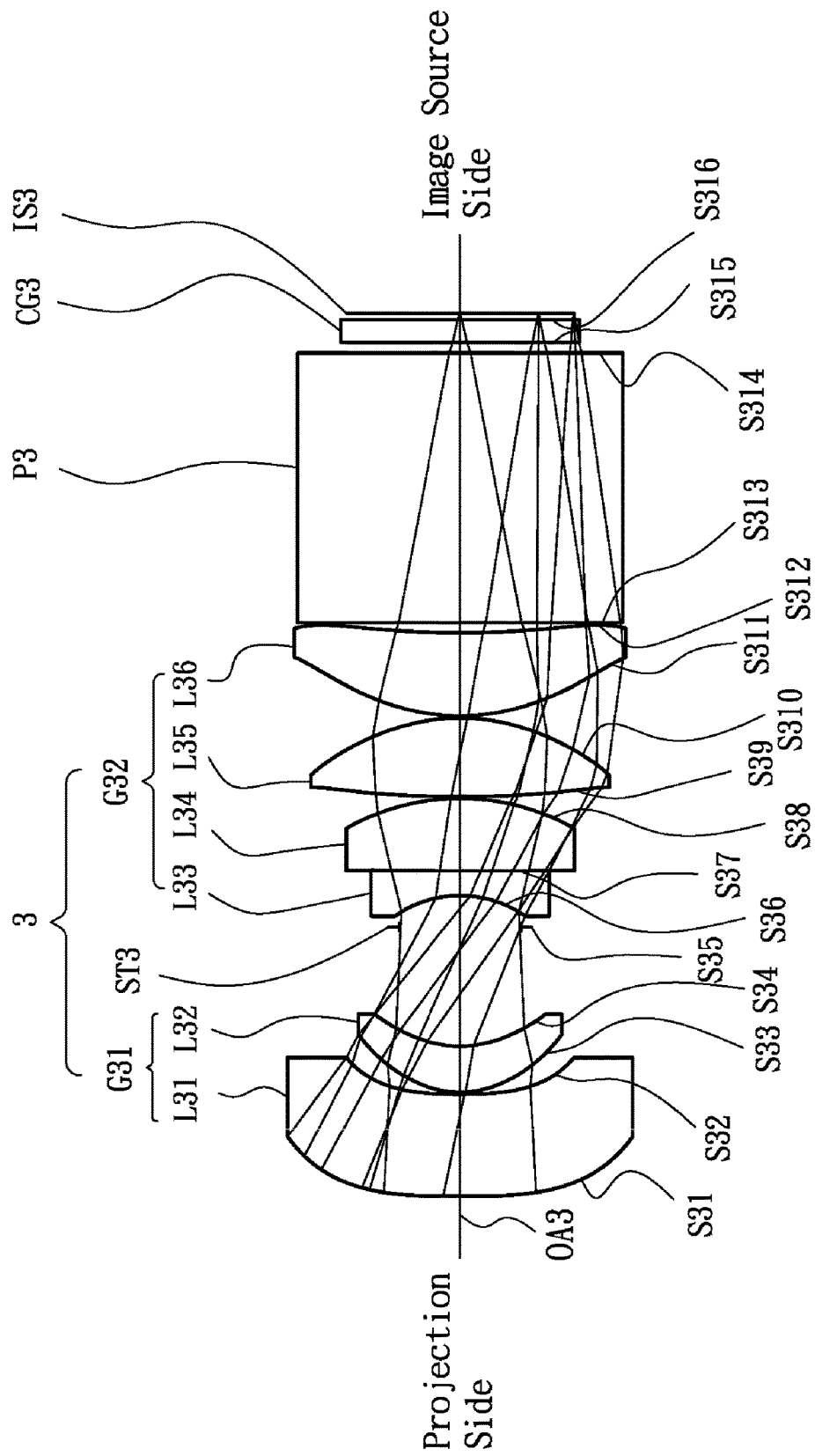
FIG. 5 is a lens layout and optical path diagram of a projection lens in accordance with a third embodiment of the invention.

Referring to FIG. 5, FIG. 5 is a lens layout and optical path diagram of a projection lens in accordance with a third embodiment of the invention. The projection lens 3 includes a first lens group G31, a stop ST3 and a second lens group G32, all of which are arranged in sequence from a projection side to an image source side along an optical axis OA3. In operation, light rays from an image source IS3 are projected on the projection side. The first lens group G31 is with positive refractive power and includes a first lens L31 and a second lens L32, all of which are arranged in sequence from the projection side to the image source side along the optical axis OA3. The first lens L31 is a meniscus lens with negative refractive power, made of plastic material and includes a convex surface S31 facing the projection side and a concave surface S32 facing the image source side, wherein both of the convex surface S31 and concave surface S32 are aspheric surfaces. The second lens L32 is a meniscus lens with positive refractive power, made of plastic material and includes a convex surface S33 facing the projection side and a concave surface S34 facing the image source side, wherein both of the convex surface S33 and concave surface S34 are aspheric surfaces. The second lens group G32 is with positive refractive power and includes a third lens L33, a fourth lens L34, a fifth lens L35 and a sixth lens L36, all of which are arranged in sequence from the projection side to the image source side along the optical axis OA3. The third lens L33 is a biconcave lens with negative refractive power, made of glass material and includes a concave surface S36 facing the projection side, wherein the concave surface S36 is a spherical surface. The fourth lens L34 is a biconvex lens with positive refractive power, made of glass material and includes a convex surface S38 facing the image source side, wherein the convex surface S38 is a spherical surface. The third lens L33 and the fourth lens L34 are cemented together to form a cemented lens. The cemented lens is with negative refractive power. The fifth lens L35 is a biconvex lens with positive refractive power, made of plastic material and includes a convex surface S39 facing the projection side and a convex surface S5310 facing the image source side, wherein both of the convex surface S39 and convex surface S310 are aspheric surfaces. The sixth lens L36 is a meniscus lens with positive refractive power, made of plastic material and includes a convex surface S311 facing the projection side and a concave surface S312 facing the image source side, wherein both of the convex surface S311 and concave surface S312 are aspheric surfaces.

A prism P3 is disposed between the second lens group G32 and the image source IS3. A cover glass CG3 is disposed between the prism P3 and the image source IS3. All of the surfaces S313, S314, S315 and S316 are plane surfaces.

In order to maintain excellent optical performance of the projection lens in accordance with the third embodiment of the invention, the projection lens 3 must satisfies the following ten conditions:

$$-0.579 \leq f3_3/f3 \leq -0.4 \tag{21}$$

$$0.0094 \leq BFL3/TTL3 \leq 0.118 \tag{22}$$

$$IMGH3/TTL3 \leq 0.148 \tag{23}$$

$$0.268 \leq f3/TTL3 \leq 0.31 \tag{24}$$

$$-8 \leq f3_1/f3 \leq -3.444 \tag{25}$$

$$2.093 \leq f3_2/f3 \leq 2.988 \tag{26}$$

$$0.849 \leq f3_4/f3 \leq 1.1365 \tag{27}$$

$$-2.7 \leq f3_{34}/f3 \leq -1.4 \tag{28}$$

$$0.33 \leq f3_5/f3 \leq 1.255 \tag{29}$$

$$2.07 \leq f3_6/f3 \leq 2.78 \tag{30}$$

wherein $f3_3$ is an effective focal length of the third lens L33, f3 is an effective focal length of the projection lens 3, BFL3 is a distance from the concave surface S312 of the sixth lens L36 to the projection side surface S313 of the prism P3 along the optical axis OA3, TTL3 is a distance from the convex surface S31 of the first lens L31 to the image source IS3 along the optical axis OA3, IMGH3 is an image height of the projection lens 3, $f3_1$ is an effective focal length of the first lens L31, $f3_2$ is an effective focal length of the second lens L32, $f3_4$ is an effective focal length of the fourth lens L34, $f3_{34}$ is an effective focal length of the combination of the third lens L33 and the fourth lens L34, $f3_5$ is an effective focal length of the fifth lens L35 and $f3_6$ is an effective focal length of the sixth lens L36.

By the above design of the lenses and stop ST3, the projection lens 3 is provided with a shortened total lens length, a decreased F-number, a decreased throw ratio, an effective corrected aberration and an increased resolution.

In order to achieve the above purpose and effectively enhance the optical performance, the projection lens 3 in accordance with the third embodiment of the invention is provided with the optical specifications shown in Table 5, which include the effective focal length, F-number, throw ratio, total lens length, radius of curvature of each lens surface, thickness between adjacent surface, refractive index of each lens and Abbe number of each lens. Table 5 shows that the effective focal length is equal to 11.4 mm, F-number is equal to 1.55, throw ratio is equal to 1.65 and total lens length is equal to 42.5339 mm for the projection lens 3 of the third embodiment of the invention.

TABLE 5

Effective Focal Length = 11.4 mm
F-number = 1.55
Throw Ratio = 1.65
Total Lens Length = 42.5339 mm

| Surface Number | Radius of Curvature (mm) | Thickness (mm) | Nd | Vd | Remark |
|---|---|---|---|---|---|
| S31 | 299.039 | 4.918 | 1.53 | 56.07 | The First Lens L31 |
| S32 | 29.775 | 0.100 | | | |
| S33 | 4.766 | 2.200 | 1.61 | 25.57 | The Second Lens L32 |
| S34 | 5.070 | 5.734 | | | |
| S35 | ∞ | 1.515 | | | Stop ST3 |
| S36 | −5.453 | 1.200 | 1.81 | 22.76 | The Third Lens L33 |
| S37 | 448.529 | 3.500 | 1.83 | 42.71 | The Fourth Lens L34 |
| S38 | −11.100 | 0.100 | | | |
| S39 | 78.659 | 3.767 | 1.53 | 56.07 | The Fifth Lens L35 |
| S310 | −9.705 | 0.100 | | | |
| S311 | 10.321 | 4.000 | 1.53 | 56.07 | The Sixth Lens L36 |
| S312 | 47.943 | 0.500 | | | |
| S313 | ∞ | 13 | 1.74 | 49.22 | Prism P3 |
| S314 | ∞ | 0.5 | | | |
| S315 | ∞ | 1.1 | 1.50 | 61.61 | Cover Glass CG3 |
| S316 | ∞ | 0.3 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the third embodiment, the conic constant k and the aspheric coefficients A, B, C, D, E of each surface are shown in Table 6.

TABLE 6

| Surface Number | k | A | B | C | D | E |
|---|---|---|---|---|---|---|
| S31 | −2.3189E+01 | 9.6213E−04 | −1.6770E−05 | 2.9495E−07 | −2.8612E−09 | 1.3917E−11 |
| S32 | 1.0421E+01 | 1.7246E−03 | −4.0045E−05 | 9.2484E−07 | 0.0000E+00 | 0.0000E+00 |
| S33 | −8.2103E−01 | 8.1383E−05 | 3.4126E−06 | −8.8255E−07 | 6.1889E−08 | −7.8920E−10 |
| S34 | −3.6533E+00 | 1.3797E−03 | −3.7598E−05 | 9.6977E−07 | 0.0000E+00 | 0.0000E+00 |
| S39 | 4.0785E+01 | 1.7590E−04 | −3.2927E−06 | 1.5225E−08 | 4.9019E−10 | −1.3351E−11 |
| S310 | 4.6400E−01 | 2.2535E−04 | 3.1789E−07 | 3.1240E−08 | 2.7552E−10 | −3.6157E−12 |

TABLE 6-continued

| Surface Number | k | A | B | C | D | E |
|---|---|---|---|---|---|---|
| S311 | −9.7562E−01 | 2.3645E−05 | −5.5961E−07 | 3.2395E−09 | −1.4711E−11 | −3.7821E−12 |
| S312 | 1.3129E+01 | 7.5847E−06 | −2.9991E−07 | −2.3462E−08 | −2.0893E−10 | 1.2476E−12 |

For the projection lens 3 of the third embodiment, the effective focal length $f3_3$ of the third lens L33 is equals to −6.5977 mm, the effective focal length f3 of the projection lens 3 is equal to 11.4 mm, the distance BFL3 from the concave surface S312 of the sixth lens L36 to the projection side surface S313 of the prism P3 along the optical axis OA3 is equal to 0.5 mm, the distance TTL3 from the convex surface S31 of the first lens L31 to the image source IS3 along the optical axis OA3 is equal to 42.5339 mm, the image height IMGH3 of the projection lens 3 is equal to 5.45 mm, the effective focal length $f3_1$ of the first lens L31 is equal to −62.015 mm, the effective focal length $f3_2$ of the second lens L32 is equal to 34.0668 mm, the effective focal length $f3_4$ of the fourth lens L34 is equal to 12.9565 mm, the effective focal length $f3_{34}$ of the combination of the third lens L33 and the fourth lens L34 is equal to −22.246 mm, the effective focal length $f3_5$ of the fifth lens L35 is equal to 3.766 mm and the effective focal length $f3_6$ of the sixth lens L36 is equal to 23.63 mm. According to the above data, the following values can be obtained:

$$f3_3/f3=-0.579,$$

$$BFL3/TTL3=0.0118,$$

$$IMGH3/TTL3=0.129,$$

$$f3/TTL3=0.269,$$

$$f3_1/f3=-5.44,$$

$$f3_2/f3=2.988,$$

$$f3_4/f3=1.1365,$$

$$f3_{34}/f3=-1.951,$$

$$f3_5/f3=0.33,$$

$$f3_6/f3=2.07$$

which respectively satisfy the above conditions (21)-(30).

Figure 6A:
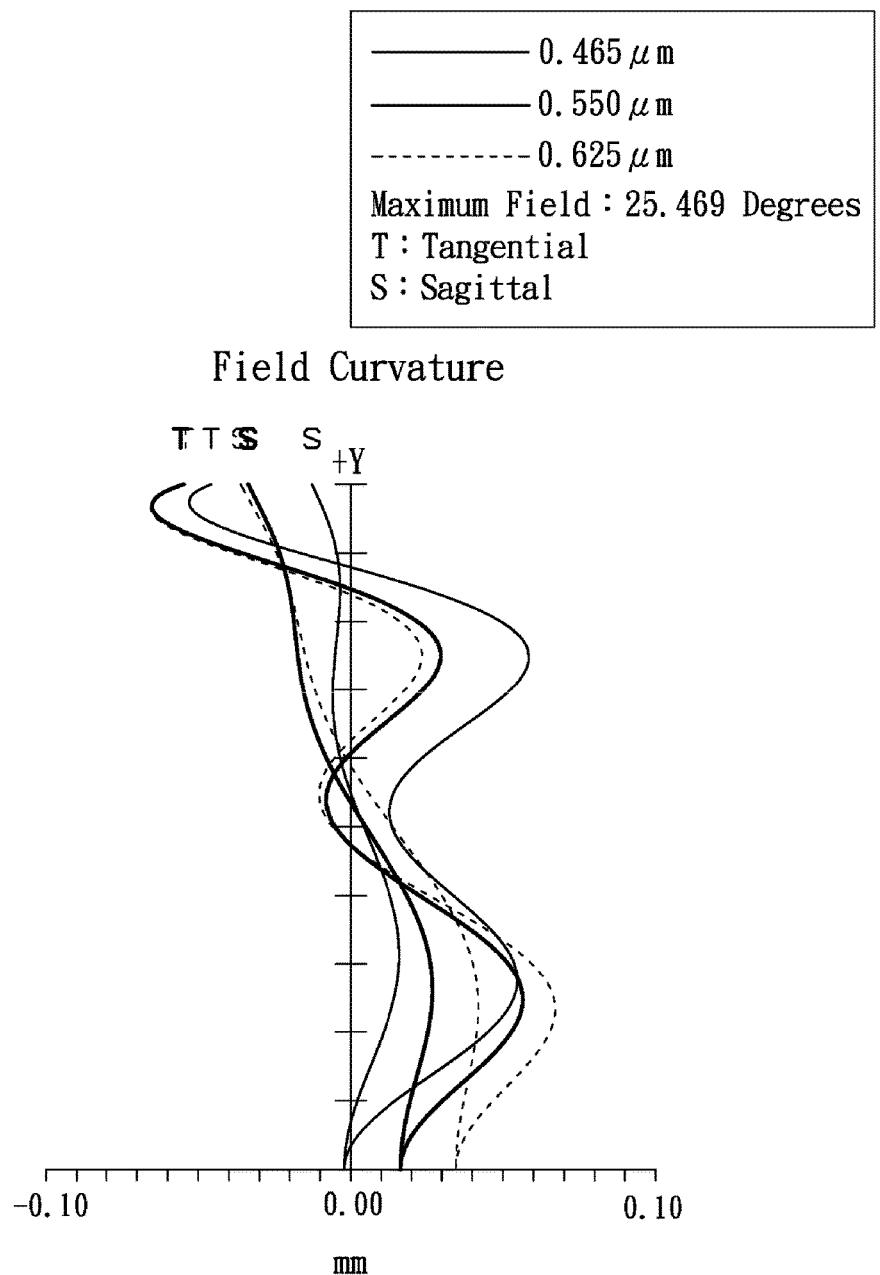
FIG. 6A is a field curvature diagram of the projection lens in accordance with the third embodiment of the invention.
Figure 6B:
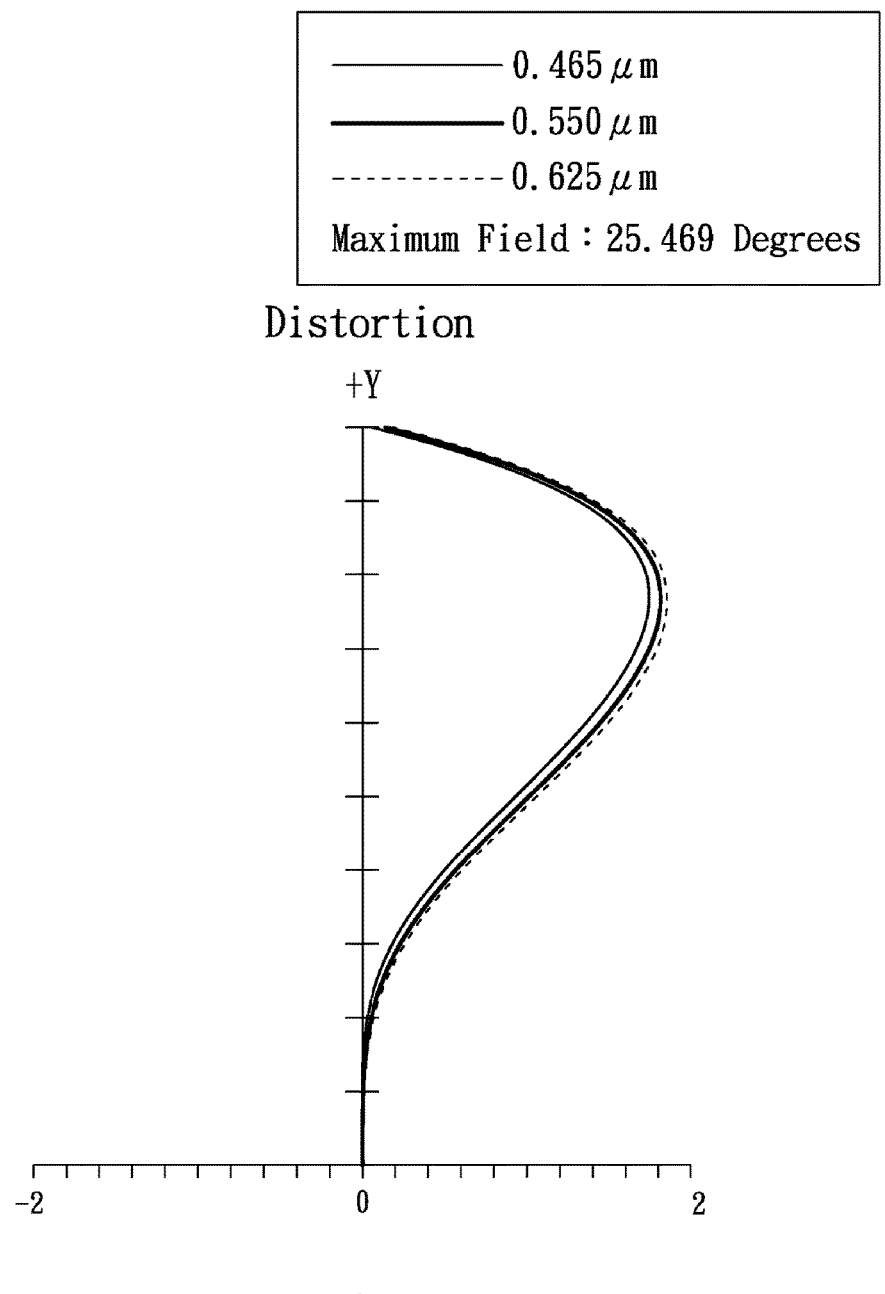
FIG. 6B is a distortion diagram of the projection lens in accordance with the third embodiment of the invention.
Figure 6D:
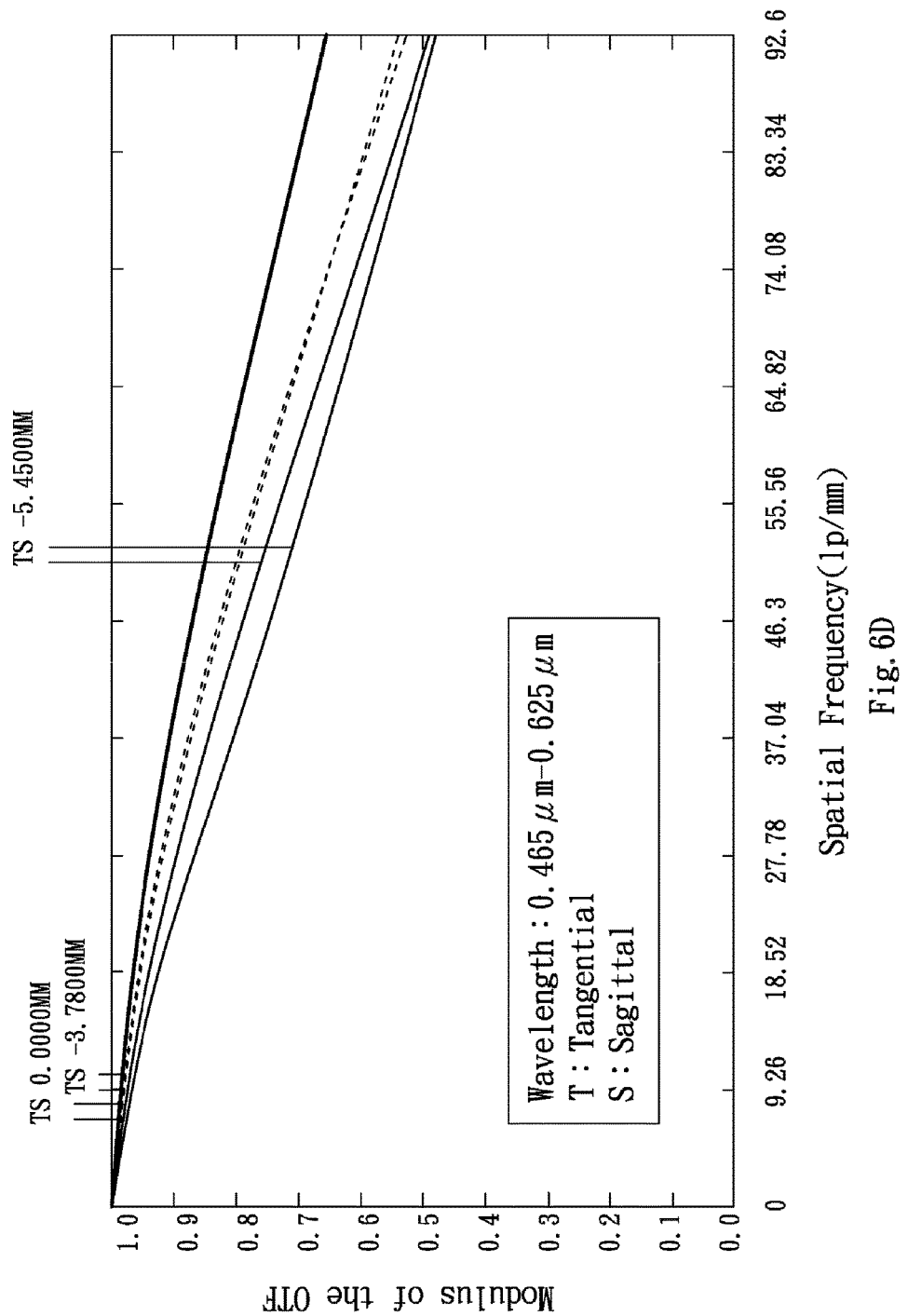
FIG. 6D is a modulation transfer function diagram of the projection lens in accordance with the third embodiment of the invention.

By the above arrangements of the lenses and stop ST3, the projection lens 3 of the third embodiment can meet the requirements of optical performance as seen in FIGS. 6A-6D, wherein FIG. 6A shows the field curvature diagram of the projection lens 3 of the third embodiment, FIG. 6B shows the distortion diagram of the projection lens 3 of the third embodiment, FIG. 6C shows the lateral color diagram of the projection lens 3 of the third embodiment and FIG. 6D shows the modulation transfer function diagram of the projection lens 3 of the third embodiment.

It can be seen from FIG. 6A that the field curvature of tangential direction and sagittal direction in the third embodiment ranges between −0.07 mm and 0.07 mm for the wavelength of 0.465 μm, 0.550 μm, and 0.625 μm. It can be seen from FIG. 6B that the distortion in the third embodiment ranges between 0.0% and 1.9% for the wavelength of 0.465 μm, 0.550 μm, and 0.625 μm. It can be seen from FIG. 6C that the lateral color of different fields in the third embodiment ranges between 0.0 μm and 3.5 μm for the wavelength of 0.465 μm, 0.550 μm, and 0.625 μm. It can be seen from FIG. 6D that the modulation transfer function of tangential direction and sagittal direction in the third embodiment ranges between 0.47 and 1.0 for the wavelength ranges between 0.465 μm and 0.625 μm, each field is 0.0000 mm, −3.7800 mm, and −5.4500 mm, spatial frequency ranges between 0 lp/mm and 92.6 lp/mm. It is obvious that the field curvature, the distortion and the lateral color of the projection lens 3 of the third embodiment can be corrected effectively, and the resolution of the projection lens 3 of the third embodiment can meet the requirement. Therefore, the projection lens 3 of the third embodiment is capable of good optical performance.

Figure 7:
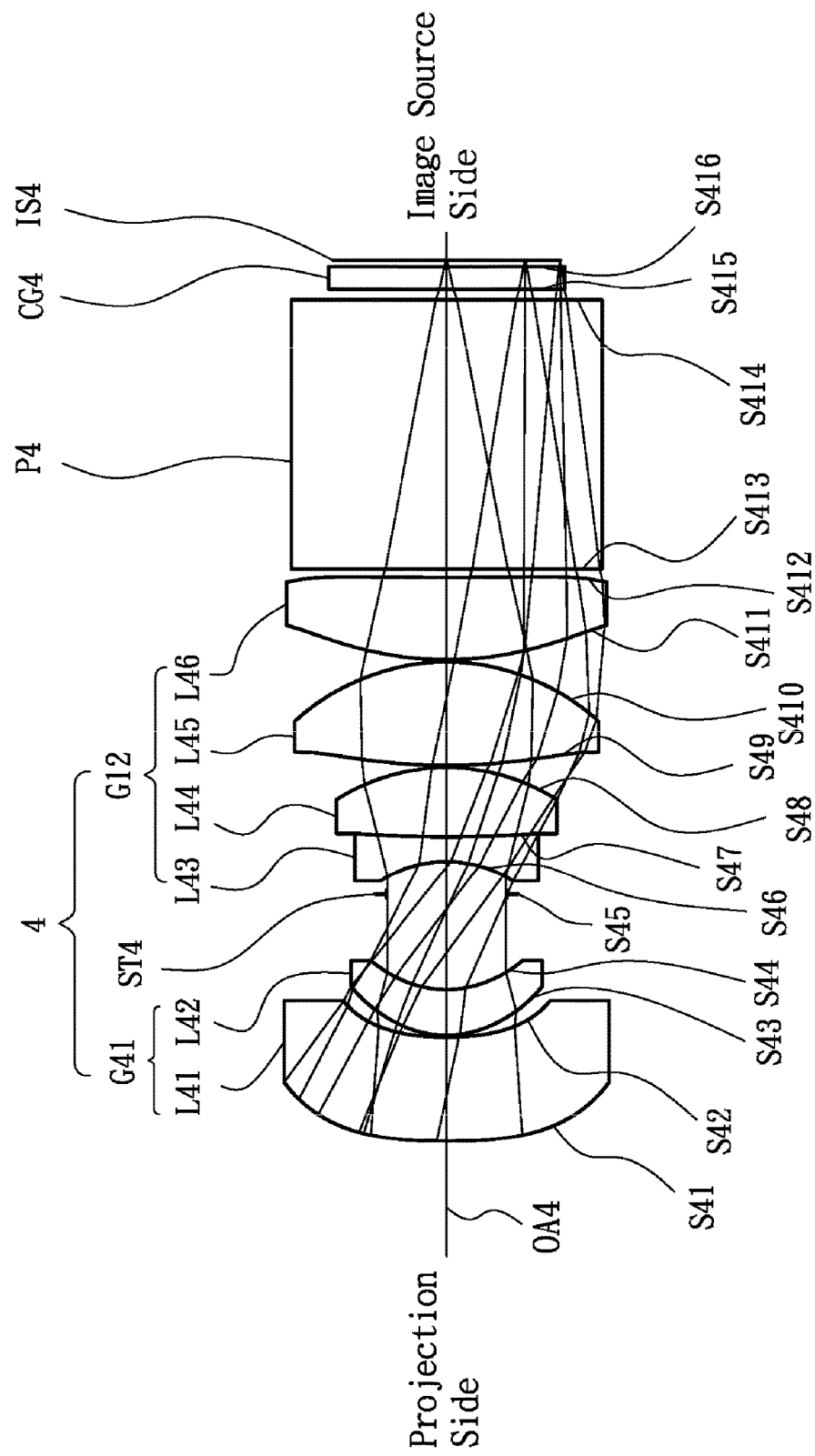
FIG. 7 is a lens layout and optical path diagram of a projection lens in accordance with a fourth embodiment of the invention.

Referring to FIG. 7, FIG. 7 is a lens layout and optical path diagram of a projection lens in accordance with a fourth embodiment of the invention. The projection lens 4 includes a first lens group G41, a stop ST4 and a second lens group G42, all of which are arranged in sequence from a projection side to an image source side along an optical axis OA4. In operation, light rays from an image source IS4 are projected on the projection side. The first lens group G41 is with positive refractive power and includes a first lens L41 and a second lens L42, all of which are arranged in sequence from the projection side to the image source side along the optical axis OA4. The first lens L41 is a meniscus lens with negative refractive power, made of plastic material and includes a convex surface S41 facing the projection side and a concave surface S42 facing the image source side, wherein both of the convex surface S41 and concave surface S42 are aspheric surfaces. The second lens L42 is a meniscus lens with positive refractive power, made of glass material and includes a convex surface S43 facing the projection side and a concave surface S44 facing the image source side, wherein both of the convex surface S43 and concave surface S44 are aspheric surfaces. The second lens group G42 is with positive refractive power and includes a third lens L43, a fourth lens L44, a fifth lens L45 and a sixth lens L46, all of which are arranged in sequence from the projection side to the image source side along the optical axis OA4. The third lens L43 is a biconcave lens with negative refractive power, made of glass material and includes a concave surface S46 facing the projection side, wherein the concave surface S46 is a spherical surface. The fourth lens L44 is a biconvex lens with positive refractive power, made of glass material and includes a convex surface S48 facing the image source side, wherein the convex surface S48 is a spherical surface. The third lens L43 and the fourth lens L44 are cemented together to form a cemented lens. The cemented lens is with negative refractive power. The fifth lens L45 is a biconvex lens with positive refractive power, made of plastic material and includes a convex surface S49 facing the projection side and a convex surface S410 facing the image source side, wherein both of the convex surface S49 and convex surface S410 are aspheric surfaces. The sixth lens L46 is a meniscus lens with positive refractive power, made of plastic material and includes a convex surface S411 facing the projection side and a concave surface S412 facing the image source side, wherein both of the convex surface S411 and concave surface S412 are aspheric surfaces.

A prism P4 is disposed between the second lens group G42 and the image source IS4. A cover glass CG4 is disposed between the prism P4 and the image source IS4. All of the surfaces S413, S414, S415 and S416 are plane surfaces.

In order to maintain excellent optical performance of the projection lens in accordance with the fourth embodiment of the invention, the projection lens 4 must satisfies the following ten conditions:

$$-0.579 \leq f4_3/f4 \leq -0.4 \quad (31)$$

$$0.0094 \leq BFL4/TTL4 \leq 0.118 \quad (32)$$

$$IMGH4/TTL4 \leq 0.148 \quad (33)$$

$$0.268 \leq f4/TTL4 \leq 0.31 \quad (34)$$

$$-8 \leq f4_1/f4 \leq -3.444 \quad (35)$$

$$2.093 \leq f4_2/f4 \leq 2.988 \quad (36)$$

$$0.849 \leq f4_4/f4 \leq 1.1365 \quad (37)$$

$$-2.7 \leq f4_{34}/f4 \leq -1.4 \quad (38)$$

$$0.33 \leq f4_5/f4 \leq 1.255 \quad (39)$$

$$2.07 \leq f4_6/f4 \leq 2.78 \quad (40)$$

wherein $f4_3$ is an effective focal length of the third lens L43, f4 is an effective focal length of the projection lens 4, BFL4 is a distance from the concave surface S412 of the sixth lens L46 to the projection side surface S413 of the prism P4 along the optical axis OA4, TTL4 is a distance from the convex surface S41 of the first lens L41 to the image source IS4 along the optical axis OA4, IMGH4 is an image height of the projection lens 4, $f4_1$ is an effective focal length of the first lens L41, $f4_2$ is an effective focal length of the second lens L42, $f4_4$ is an effective focal length of the fourth lens L44, $f4_{34}$ is an effective focal length of the combination of the third lens L43 and the fourth lens L44, $f4_5$ is an effective focal length of the fifth lens L45 and $f4_6$ is an effective focal length of the sixth lens L46.

By the above design of the lenses and stop ST4, the projection lens 4 is provided with a shortened total lens length, a decreased F-number, a decreased throw ratio, an effective corrected aberration and an increased resolution.

In order to achieve the above purpose and effectively enhance the optical performance, the projection lens 4 in accordance with the fourth embodiment of the invention is provided with the optical specifications shown in Table 7, which include the effective focal length, F-number, throw ratio, total lens length, radius of curvature of each lens surface, thickness between adjacent surface, refractive index of each lens and Abbe number of each lens. Table 7 shows that the effective focal length is equal to 11.4 mm, F-number is equal to 1.55, throw ratio is equal to 1.65 and total lens length is equal to 42.542 mm for the projection lens 4 of the fourth embodiment of the invention.

TABLE 7

Effective Focal Length = 11.4 mm
F-number = 1.55
Throw Ratio = 1.65
Total Lens Length = 42.542 mm

| Surface Number | Radius of Curvature (mm) | Thickness (mm) | Nd | Vd | Remark |
|---|---|---|---|---|---|
| S41 | 38.604 | 5.011 | 1.53 | 56.07 | The First Lens L41 |
| S42 | 13.013 | 0.100 | | | |
| S43 | 4.911 | 2.200 | 1.84 | 23.82 | The Second Lens L42 |
| S44 | 4.863 | 4.609 | | | |
| S45 | ∞ | 1.582 | | | Stop ST4 |
| S46 | −5.906 | 1.200 | 1.84 | 23.82 | The Third Lens L43 |
| S47 | 60.494 | 3.340 | 1.81 | 46.62 | The Fourth Lens L44 |
| S48 | −9.886 | 0.100 | | | |
| S49 | 26.101 | 5.000 | 1.53 | 56.07 | The Fifth Lens L45 |
| S410 | −10.154 | 0.100 | | | |
| S411 | 15.805 | 4.000 | 1.53 | 56.07 | The Sixth Lens L46 |
| S412 | 203.937 | 0.400 | | | |
| S413 | ∞ | 13 | 1.74 | 49.22 | Prism P4 |
| S414 | ∞ | 0.5 | | | |
| S415 | ∞ | 1.1 | 1.50 | 61.61 | Cover Glass CG4 |
| S416 | ∞ | 0.3 | | | |

The aspheric surface sag z of each lens in table 7 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the fourth embodiment, the conic constant k and the aspheric coefficients A, B, C, D, E of each surface are shown in Table 8.

TABLE 8

| Surface Number | k | A | B | C | D | E |
|---|---|---|---|---|---|---|
| S41 | 1.8122E+01 | 7.2607E−04 | −1.2056E−05 | 2.2546E−07 | −2.2741E−09 | 1.1716E−11 |
| S42 | 1.4954E+00 | 9.8909E−04 | −1.9474E−05 | 1.0574E−06 | 0.0000E+00 | 0.0000E+00 |
| S43 | −9.0214E−01 | 7.2608E−05 | −7.1677E−06 | 5.5097E−07 | 2.9984E−08 | −4.2958E−10 |
| S44 | −1.5426E+00 | 3.8482E−04 | −6.9597E−06 | 2.0688E−06 | 0.0000E+00 | 0.0000E+00 |
| S49 | −2.3314E+00 | −4.6089E−05 | −1.0805E−06 | 1.1622E−08 | 1.8146E−10 | −1.0699E−11 |
| S410 | 4.8535E−01 | 1.3026E−04 | 1.5653E−06 | −4.0172E−10 | 3.1842E−10 | −3.2575E−12 |
| S411 | −1.6177E+00 | −8.9472E−06 | 3.6620E−07 | −3.8505E−09 | −2.1644E−10 | 3.0645E−13 |
| S412 | 4.4050E+02 | −3.0930E−05 | −5.7423E−07 | −1.5939E−08 | −2.2584E−11 | 2.3708E−14 |

For the projection lens 4 of the fourth embodiment, the effective focal length $f4_3$ of the third lens L43 is equals to −6.248 mm, the effective focal length f4 of the projection lens 4 is equal to 11.4 mm, the distance BFL4 from the concave surface S412 of the sixth lens L46 to the projection side surface S413 of the prism P4 along the optical axis OA4 is equal to 0.4 mm, the distance TTL4 from the convex surface S41 of the first lens L41 to the image source IS4 along the optical axis OA4 is equal to 42.542 mm, the image height IMGH4 of the projection lens 4 is equal to 5.45 mm, the effective focal length $f4_1$ of the first lens L41 is equal to −39.263 mm, the effective focal length $f4_2$ of the second lens L42 is equal to 28.956 mm, the effective focal length $f4_4$ of the fourth lens L44 is equal to 10.593 mm, the effective focal length $f4_{34}$ of the combination of the third lens L43 and the fourth lens L44 is equal to −30.812 mm, the effective focal length $f4_5$ of the fifth lens L45 is equal to 14.3116 mm and the effective focal length $f4_6$ of the sixth lens L46 is equal to 31.69 mm. According to the above data, the following values can be obtained:

$$f4_3/f4=-0.548,$$

$$BFL4/TTL4=0.0094,$$

$$IMGH4/TTL4=0.128,$$

$$f4/TTL4=0.268,$$

$$f4_1/f4=-3.444,$$

$$f4_2/f4=2.54,$$

$$f4_4/f4=0.93,$$

$$f4_{34}/f4=-2.7,$$

$$f4_5/f4=1.255,$$

$$f4_6/f4=2.78$$

which respectively satisfy the above conditions (31)-(40).

Figure 8A:
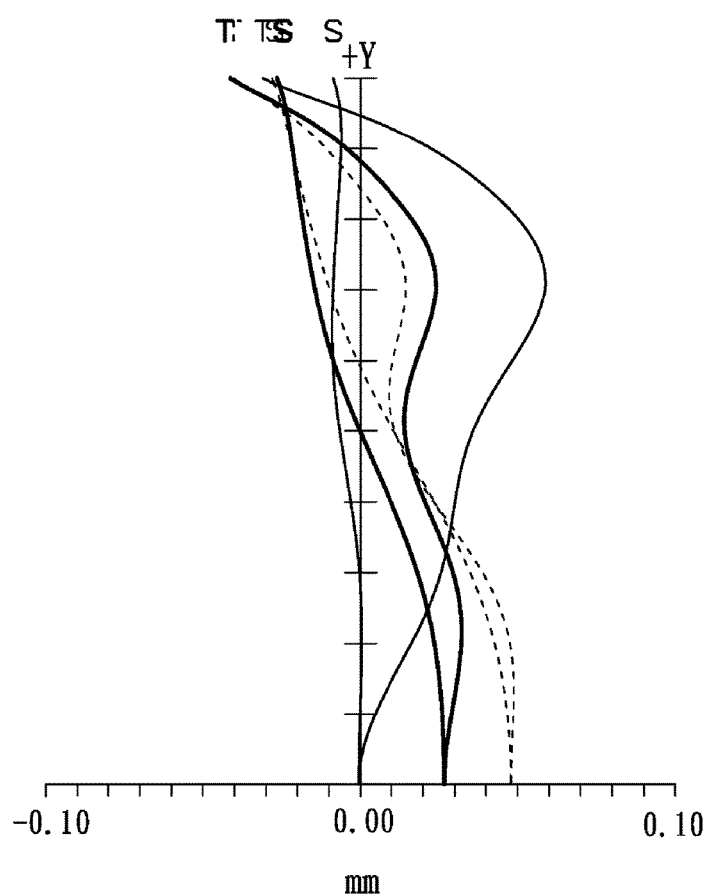
FIG. 8A is a field curvature diagram of the projection lens in accordance with the fourth embodiment of the invention.
Figure 8B:
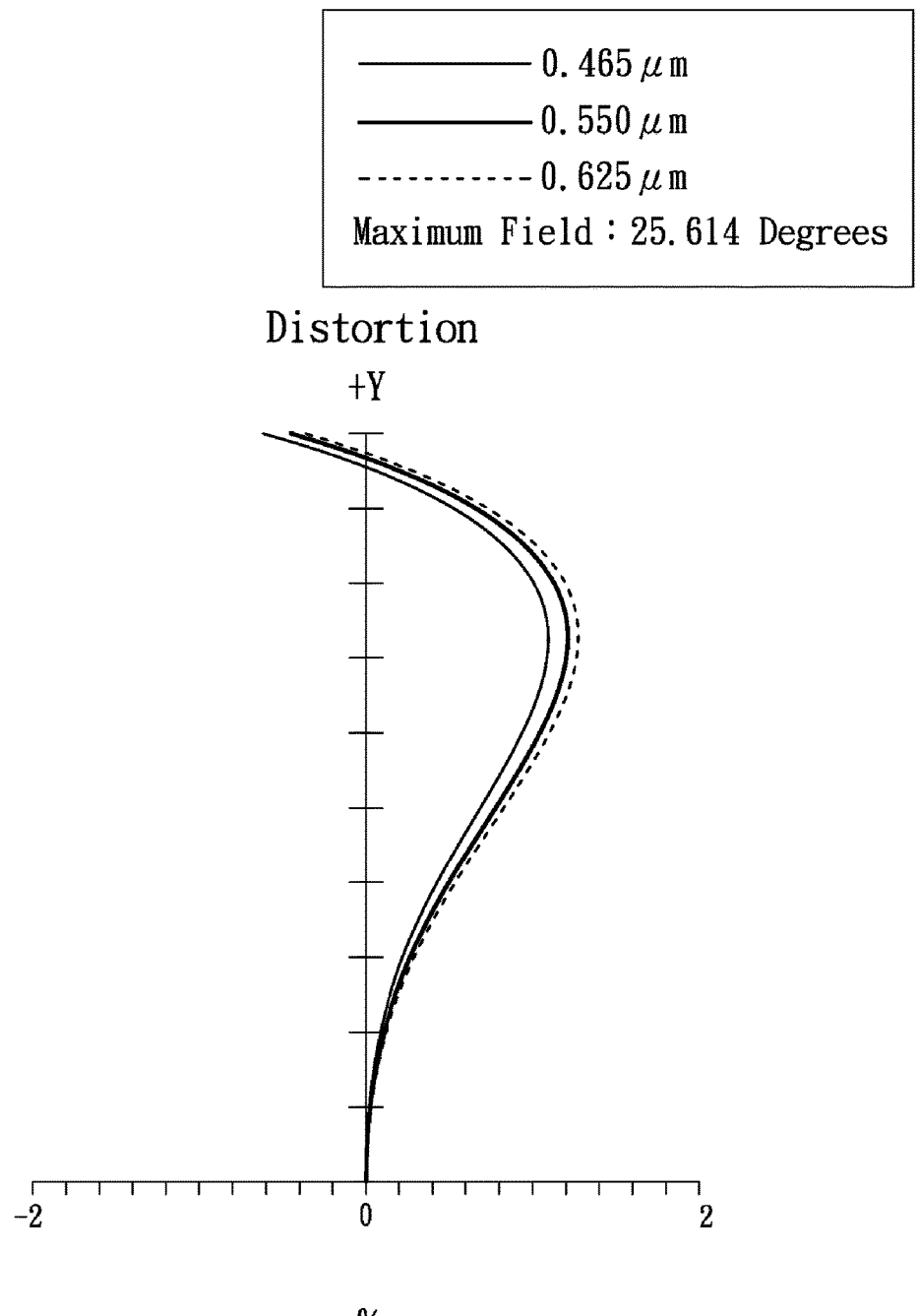
FIG. 8B is a distortion diagram of the projection lens in accordance with the fourth embodiment of the invention.
Figure 8C:
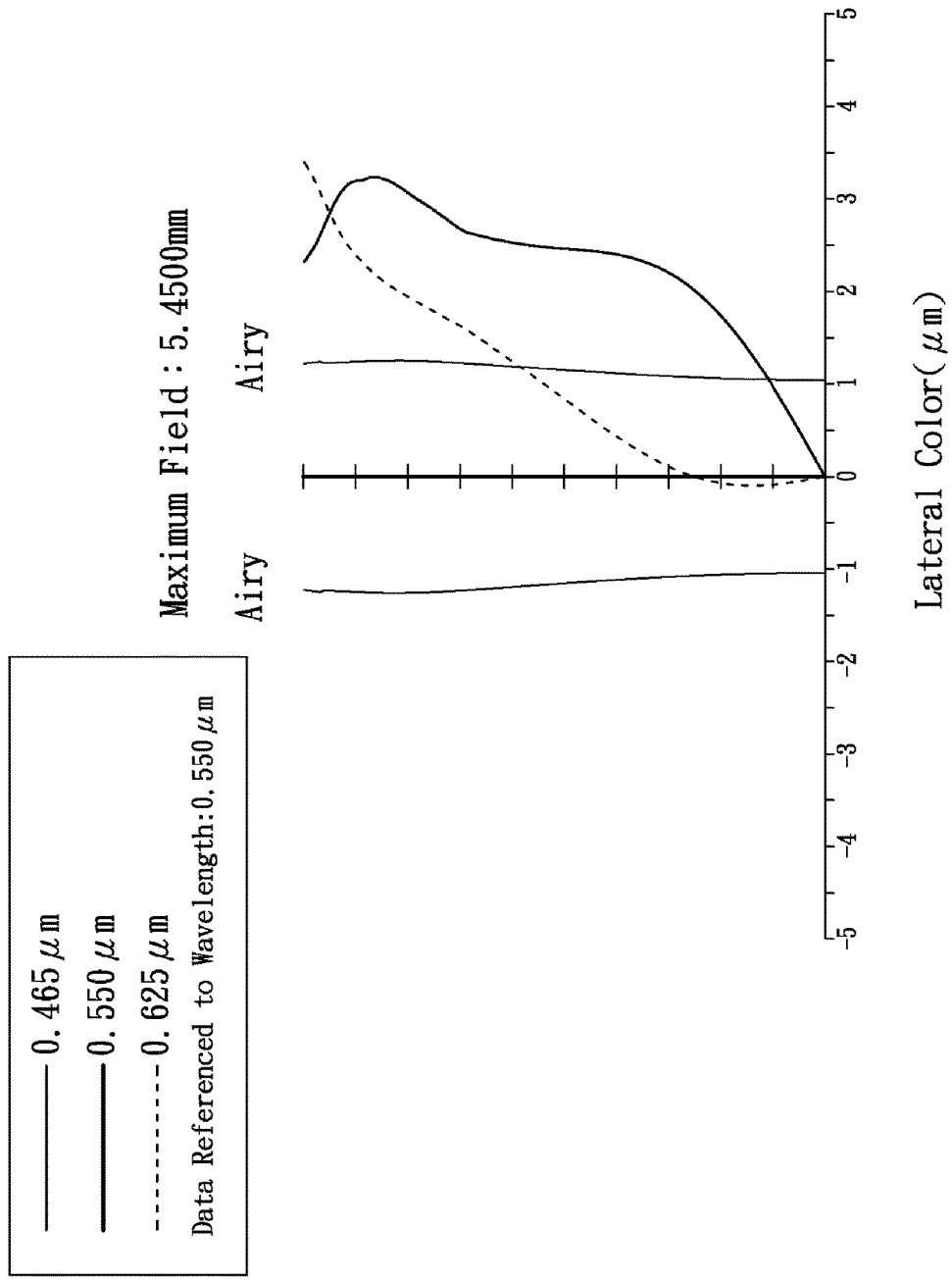
FIG. 8C is a lateral color diagram of the projection lens in accordance with the fourth embodiment of the invention.
Figure 8D:
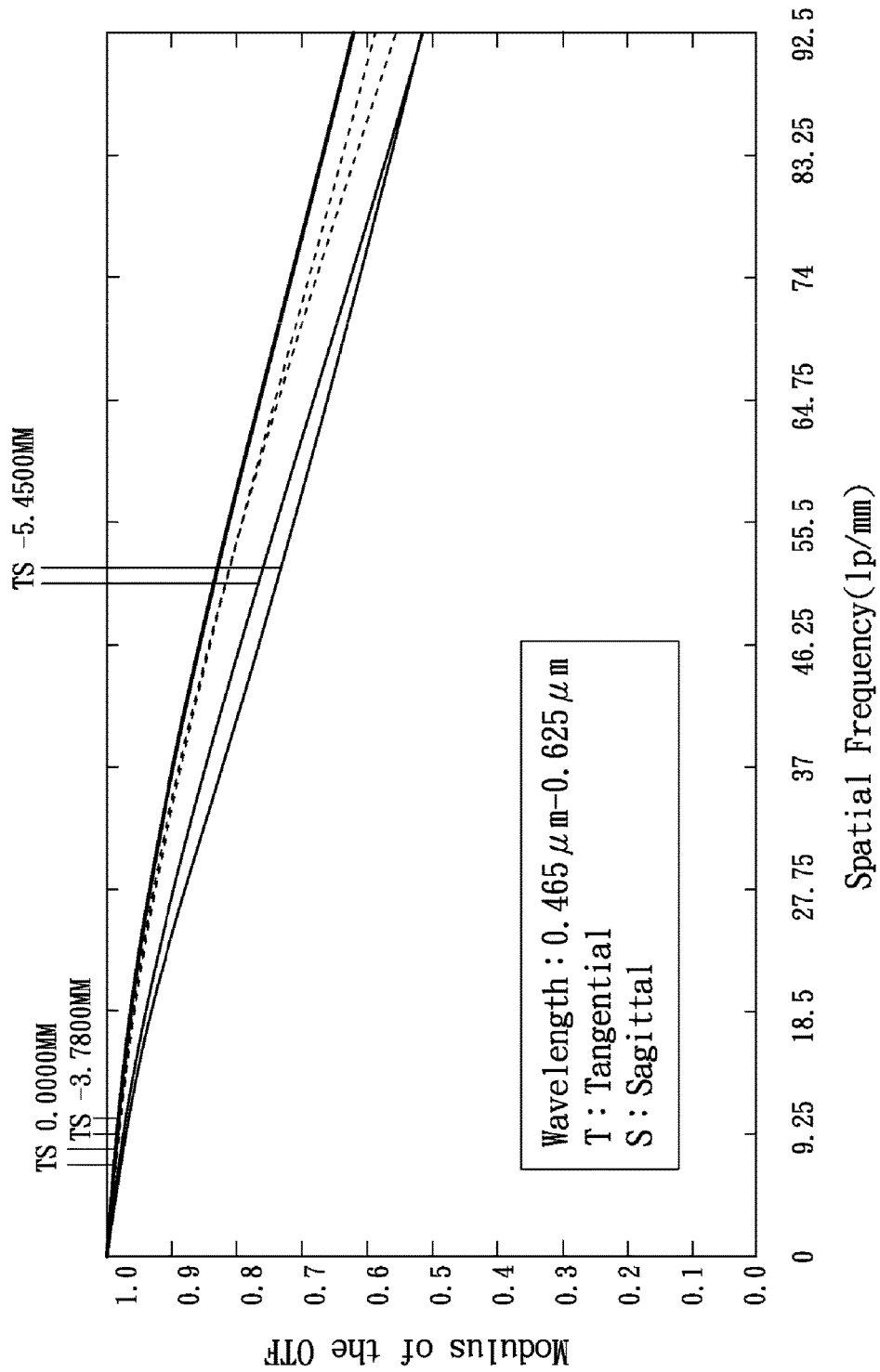
FIG. 8D is a modulation transfer function diagram of the projection lens in accordance with the fourth embodiment of the invention.

By the above arrangements of the lenses and stop ST4, the projection lens 4 of the fourth embodiment can meet the requirements of optical performance as seen in FIGS. 8A-8D, wherein FIG. 8A shows the field curvature diagram of the projection lens 4 of the fourth embodiment, FIG. 8B shows the distortion diagram of the projection lens 4 of the fourth embodiment, FIG. 8C shows the lateral color diagram of the projection lens 4 of the fourth embodiment and FIG. 8D shows the modulation transfer function diagram of the projection lens 4 of the fourth embodiment.

It can be seen from FIG. 8A that the field curvature of tangential direction and sagittal direction in the fourth embodiment ranges between −0.04 mm and 0.05 mm for the wavelength of 0.465 μm, 0.550 μm, and 0.625 μm. It can be seen from FIG. 8B that the distortion in the fourth embodiment ranges between −0.6% and 1.3% for the wavelength of 0.465 μm, 0.550 μm, and 0.625 μm. It can be seen from FIG. 8C that the lateral color of different fields in the fourth embodiment ranges between −0.5 μm and 3.5 μm for the wavelength of 0.465 μm, 0.550 μm, and 0.625 μm. It can be seen from FIG. 8D that the modulation transfer function of tangential direction and sagittal direction in the fourth embodiment ranges between 0.51 and 1.0 for the wavelength ranges between 0.465 μm and 0.625 μm, each field is 0.0000 mm, −3.7800 mm, and −5.4500 mm, spatial frequency ranges between 0 lp/mm and 92.5 lp/mm. It is obvious that the field curvature, the distortion and the lateral color of the projection lens 4 of the fourth embodiment can be corrected effectively, and the resolution of the projection lens 4 of the fourth embodiment can meet the requirement. Therefore, the projection lens 4 of the fourth embodiment is capable of good optical performance.

What is claimed is:

1. A projection lens comprising a first lens group and a second lens group, all of which are arranged in sequence from a projection side to an image source side along an optical axis, wherein:

the first lens group is with positive refractive power and comprises a fifth lens and a sixth lens, both of which are arranged in sequence from the projection side to the image source side along the optical axis, wherein the fifth lens is with negative refractive power and the sixth lens is with positive refractive power;

the second lens group is with positive refractive power and comprises a first lens, a second lens, a third lens and a fourth lens, all of which are arranged in sequence from the projection side to the image source side along the optical axis, wherein the first lens is with negative refractive power, the second lens is with positive refractive power, the third lens is with positive refractive power and the fourth lens is with positive refractive power;

the first lens and the second lens are cemented together to form a cemented lens, and the cemented lens is with negative refractive power; and the projection lens satisfies:

$$0.268 \le f/TTL \le 0.31$$

wherein TTL is a distance from a projection side surface of the first lens group to an image source along the optical axis and f is an effective focal length of the projection lens.

2. The projection lens as claimed in claim 1, further comprising a prism disposed between the second lens group and the image source side, wherein the projection lens satisfies:

$$0.0094 \le BFL/TTL1 \le 0.118$$

$$IMGH/TTL1 \le 0.148$$

wherein BFL is a distance from an image source side surface of the fourth lens to a projection side surface of the prism along the optical axis, TTL1 is a distance from a projection side surface of the fifth lens to the image source along the optical axis and IMGH is an image height of the projection lens.

3. The projection lens as claimed in claim 1, wherein the fifth lens satisfies:

$$-8 \le f_5/f \le -3.444$$

wherein $f_5$ is an effective focal length of the fifth lens and f is an effective focal length of the projection lens.

4. The projection lens as claimed in claim 1, wherein the sixth lens satisfies:

$$2.093 \le f_6/f \le 2.988$$

wherein $f_6$ is an effective focal length of the sixth lens and f is an effective focal length of the projection lens.

5. The projection lens as claimed in claim 1, wherein the fifth lens further comprises two surfaces, at least one of which is an aspheric surface.

6. The projection lens as claimed in claim 1, wherein the sixth lens further comprises two surfaces, at least one of which is an aspheric surface.

7. The projection lens as claimed in claim 1, wherein the third lens further comprises two surfaces, at least one of which is an aspheric surface.

8. The projection lens as claimed in claim 1, wherein the fourth lens further comprises two surfaces, at least one of which is an aspheric surface.

9. The projection lens as claimed in claim 1, wherein the fifth lens, the third lens and the fourth lens are made of plastic material.

10. The projection lens as claimed in claim 1, wherein the first lens and the second lens satisfy:

$0.849 \leq f_2/f \leq 1.1365$, $-2.7 \leq f_{12}/f \leq -1.4$, wherein $f_2$ is an effective focal length of the second lens, $f_{12}$ is an effective focal length of the combination of the first lens and the second lens and f is an effective focal length of the projection lens.

11. The projection lens as claimed in claim 1, wherein the third lens satisfies:

$0.33 \leq f_3/f \leq 1.255$ wherein $f_3$ is an effective focal length of the third lens and f is an effective focal length of the projection lens.

12. The projection lens as claimed in claim 1, wherein the fourth lens satisfies:

$2.07 \leq f_4/f \leq 2.78$ wherein $f_4$ is an effective focal length of the fourth lens and f is an effective focal length of the projection lens.

13. The projection lens as claimed in claim 1, wherein the first lens is made of glass material.

14. The projection lens as claimed in claim 1, further comprising a stop disposed between the first lens group and the second lens group.

15. The projection lens as claimed in claim 1, wherein the first lens satisfies:

$-0.579 \leq f_1/f \leq -0.4$ wherein $f_1$ is an effective focal length of the first lens and f is an effective focal length of the projection lens.

16. A projection lens comprising a first lens group, a second lens group and a prism, all of which are arranged in sequence from a projection side to an image source side along an optical axis, wherein:
the first lens group is with positive refractive power;
the second lens group is with positive refractive power and comprises a first lens, a second lens, a third lens and a fourth lens, all of which are arranged in sequence from the projection side to the image source side along the optical axis, wherein the first lens is with negative refractive power, the second lens is with positive refractive power, the third lens is with positive refractive power and the fourth lens is with positive refractive power;
the first lens and the second lens are cemented together to form a cemented lens, and the cemented lens is with negative refractive power; and
the projection lens satisfies:

$0.0094 \leq BFL/TTL \leq 0.118$, $0.849 \leq f_2/f \leq 1.1365$, $2.7 \leq f_{12}/f \leq -1.4$, wherein BFL is a distance from an image source side surface of the fourth lens to a projection side surface of the prism along the optical axis, TTL is a distance from a projection side surface of the first lens group to an image source along the optical axis, $f_2$ is an effective focal length of the second lens, $f_{12}$ is an effective focal length of the combination of the first lens and the second lens and f is an effective focal length of the projection lens.

17. A projection lens comprising a first lens group and a second lens group, all of which are arranged in sequence from a projection side to an image source side along an optical axis, wherein:
the first lens group is with positive refractive power;
the second lens group is with positive refractive power and comprises a first lens, a second lens, a third lens and a fourth lens, all of which are arranged in sequence from the projection side to the image source side along the optical axis, wherein the first lens is with negative refractive power, the second lens is with positive refractive power, the third lens is with positive refractive power and the fourth lens is with positive refractive power;
the first lens and the second lens are cemented together to form a cemented lens, and the cemented lens is with negative refractive power; and
the projection lens satisfies:

$IMGH/TTL \leq 0.148$, $0.849 \leq f_2/f \leq 1.1365$, $2.7 \leq f_{12}/f \leq -1.4$, wherein TTL is a distance from a projection side surface of the first lens group to an image source along the optical axis, IMGH is an image height of the projection lens, $f_2$ is an effective focal length of the second lens, $f_{12}$ is an effective focal length of the combination of the first lens and the second lens and f is an effective focal length of the projection lens.

* * * * *